US009915792B2

(12) United States Patent
Cervantes et al.

(10) Patent No.: US 9,915,792 B2
(45) Date of Patent: Mar. 13, 2018

(54) FIBER OPTIC CABLE DEMARCATIONS INHIBITING MOVEMENT OF OPTICAL FIBERS RELATIVE TO STRENGTH MEMBERS, AND RELATED ASSEMBLIES AND METHODS

(71) Applicant: CORNING OPTICAL COMMUNICATIONS LLC, Hickory, NC (US)

(72) Inventors: Marisol Aponte Cervantes, Reynosa (MX); Michael Travis Hundley, Conover, NC (US); Gregory Alan Lochkovic, Conover, NC (US); Francisco Luna Pina, Hickory, NC (US); Sherrh Clint Reinhardt, Hickory, NC (US); Thomas Theuerkorn, Hickory, NC (US); Karen Elizabeth Williams, Sherrills Ford, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/729,812

(22) Filed: Oct. 11, 2017

(65) Prior Publication Data

US 2018/0031785 A1    Feb. 1, 2018

Related U.S. Application Data

(60) Division of application No. 14/246,316, filed on Apr. 7, 2014, now Pat. No. 9,810,857, which is a (Continued)

(51) Int. Cl.
*G02B 6/36* (2006.01)
*G02B 6/38* (2006.01)
(Continued)

(52) U.S. Cl.
CPC .......... *G02B 6/3889* (2013.01); *G02B 6/245* (2013.01); *G02B 6/4479* (2013.01); *G02B 6/4471* (2013.01)

(58) Field of Classification Search
CPC .. G02B 6/3887; G02B 6/3893; G02B 6/3869; G02B 6/3821; G02B 6/3825; G02B 6/36; G02B 6/3849
See application file for complete search history.

(56) References Cited

U.S. PATENT DOCUMENTS 6,785,450 B2    8/2004 Wagman et al.
7,197,215 B2 *  3/2007 Baird ................... G02B 6/4433
                                                      385/100
(Continued)

FOREIGN PATENT DOCUMENTS

CN    101268396 A    9/2008
CN    101317112 A    7/2012
(Continued)

OTHER PUBLICATIONS

English Translation of Chinese First Office Action CN201280049755.X dated Sep. 5, 2016 and Search Report dated Aug. 25, 2016. China Patent Office.
(Continued)

*Primary Examiner* — Jennifer Doan
(74) *Attorney, Agent, or Firm* — Michael E. Carroll, Jr.

(57) ABSTRACT

Fiber optic cable demarcations inhibiting movements of optical fibers relative to strength members, and related cable assemblies and methods, are disclosed. By bonding optical fibers to strength members with a bonding agent received into at least one cavity, a demarcation may be formed inside the cable jacket at a cable jacket interface. The at least one cavity may be disposed within a cable jacket of a fiber optic cable and at the cable jacket interface. The demarcation may bond at least one optical fiber and at least one strength (Continued)

member together to inhibit longitudinal movement of the at least one optical fiber relative to the at least one strength member. In this manner, the demarcation may inhibit optical fiber movement within the fiber optic connector, which may cause tensile forces and/or buckling of the optical fiber resulting in optical fiber damage and/or optical attenuation.

12 Claims, 20 Drawing Sheets

Related U.S. Application Data continuation of application No. PCT/US2012/059781, filed on Oct. 11, 2012.

(60) Provisional application No. 61/545,698, filed on Oct. 11, 2011.

(51) Int. Cl.
  *G02B 6/44* (2006.01)
  *G02B 6/245* (2006.01)

(56) References Cited

U.S. PATENT DOCUMENTS

| | | | |
|---|---|---|---|
| 7,346,243 B2 * | 3/2008 | Cody | G02B 6/4495 385/100 |
| 8,285,096 B2 | 10/2012 | Coleman et al. | |
| 2007/0110384 A1 | 5/2007 | Cody et al. | |
| 2007/0263966 A1 | 11/2007 | Cody et al. | |
| 2008/0166094 A1 | 7/2008 | Bookbinder et al. | |
| 2008/0193089 A1 | 8/2008 | Miyamoto et al. | |
| 2008/0247720 A1 | 10/2008 | Cody et al. | |
| 2009/0169163 A1 | 7/2009 | Abbott, III et al. | |

FOREIGN PATENT DOCUMENTS

| | | |
|---|---|---|
| CN | 101598839 A | 11/2012 |
| JP | 9021936 A | 1/1997 |

OTHER PUBLICATIONS

International Search Report and Written Opinion PCT/US2012/059781 dated Jan. 30, 2013.

* cited by examiner

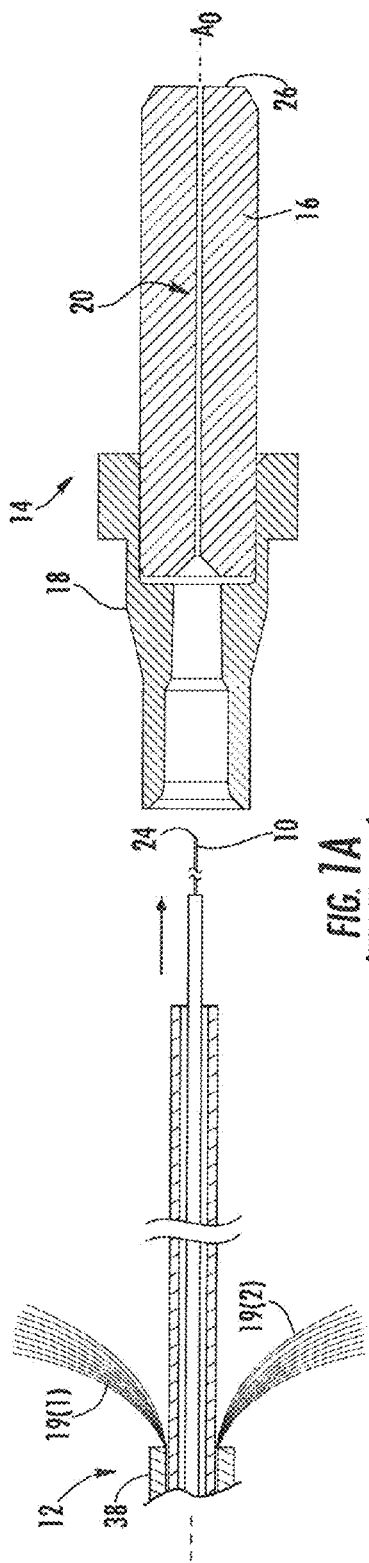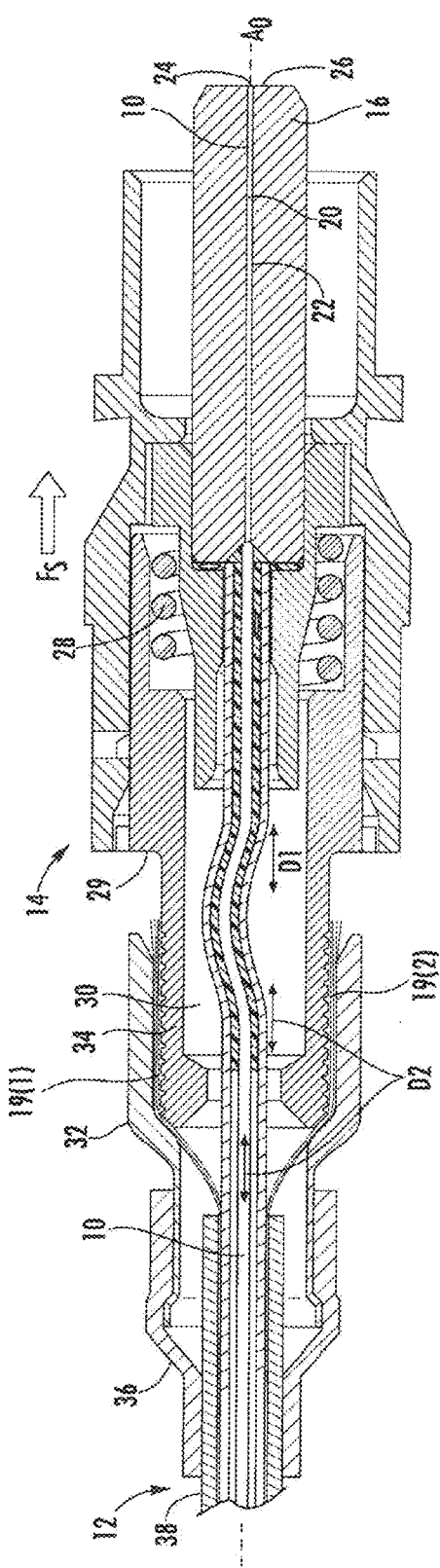
FIG. 1A (PRIOR ART)
FIG. 1B (PRIOR ART)

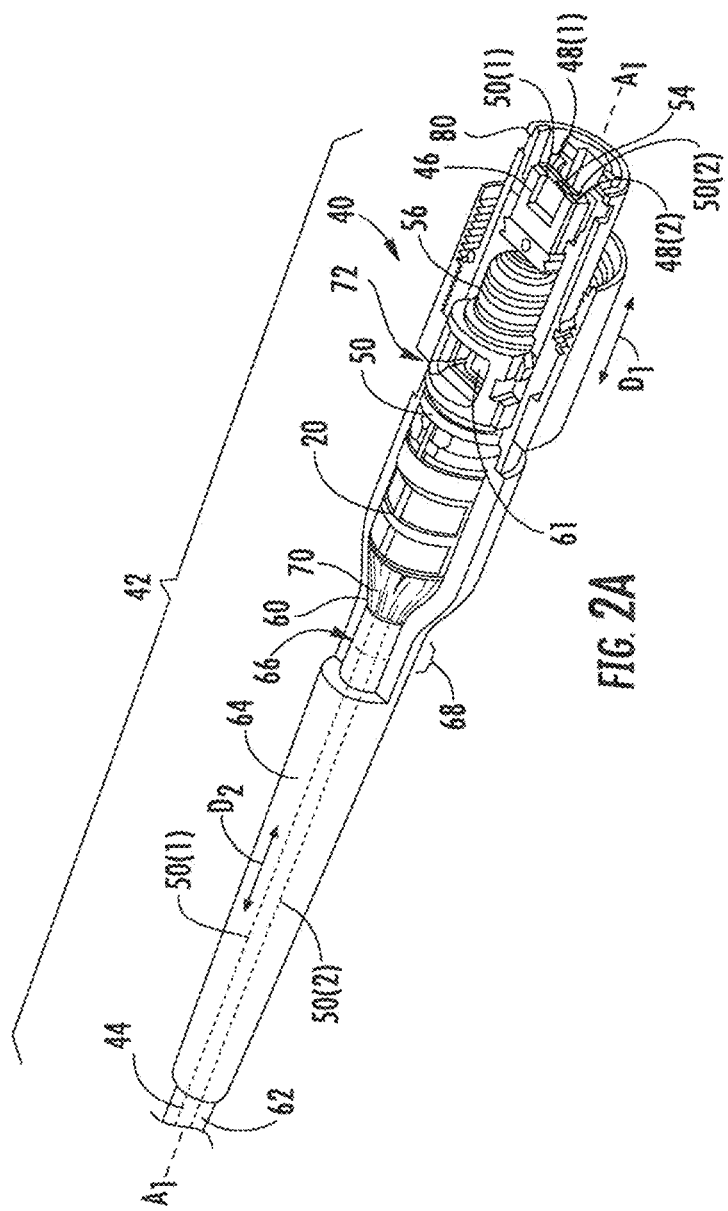

FIBER OPTIC CABLE DEMARCATIONS INHIBITING MOVEMENT OF OPTICAL FIBERS RELATIVE TO STRENGTH MEMBERS, AND RELATED ASSEMBLIES AND METHODS

PRIORITY APPLICATIONS

This application is a divisional of U.S. patent application Ser. No. 14/246,316, filed on Apr. 7, 2014, which is a continuation of U.S. International Application No. PCT/US12/59781, filed on Oct. 11, 2012, which claims the benefit of priority to U.S. Application No. 61/545,698, filed on Oct. 11, 2011, the content of which is relied upon and incorporated herein by reference in entirety.

BACKGROUND

Field

The technology of the disclosure relates to methods of preparing a demarcation of a fiber optic cable for inhibiting longitudinal movement of an optical fiber along with connectorized fiber optic cable assemblies.

Technical Background

Optical fiber is increasingly being used for a variety of applications including but not limited to broadband voice video and data transmission. Benefits of optical fiber use include extremely wide bandwidth and low noise operation. With the increasing and varied use of optical fibers it is important to provide reliable methods of interconnecting optical fibers. Fiber optic connectors have been developed for this purpose. It is important that fiber optic connectors not significantly attenuate or alter the transmitted signal. In addition, the fiber optic connector should be relatively rugged and configured to be connected and disconnected a number of times in order to accommodate changes in the optical fiber transmission path. The fiber optic cable should be reliably attached to the fiber optic connector. In this manner, the optical fiber should also be configured for its environment. For example, outdoor interconnections may require a more rugged fiber optic connector than those designed for indoor interconnections. Because of the skill and equipment required for making optical fiber connections in the field, fiber optic cables are often pre-connectorized with fiber optic connectors for plug and play connectivity.

In this manner, as shown in FIG. 1A, a conventional optical fiber 10 of a conventional fiber optic cable 12 may be inserted into a fiber optic connector 14 represented by a ferrule 16 held by a ferrule holder 18. The fiber optic cable 12 may include strength members 19(1), 19(2) to secure the fiber optic cable 12 to the fiber optic connector 14 as shown in FIG. 1B. The ferrule 16 may include a ferrule bore 20, within which the optical fiber 10 may be bonded with a bonding agent 22, for example, epoxy. The bonding agent 22 may hold an end portion 24 of the optical fiber 10 at an end face 26 of the ferrule 16 where the end portion 24 may establish an optical connection with a complementary end portion (not shown) of another optical fiber.

In order to ensure there is good contact between the end face 26 of the ferrule 16 and a complementary end portion, the ferrule 16 may be spring loaded with a spring 28 providing a spring force $F_S$ and thereby the ferrule 16 may move a longitudinal distance $D_1$ within a housing assembly 29 of the fiber optic connector 14. The housing assembly 29 may be stationary when the optical connection is established between the end portion 24 of the optical fiber 10 and the complementary end portion (not shown). The fiber optic connector 14 includes a passage 30 where the optical fiber 10 may be accommodated while the ferrule 16 moves the longitudinal distance $D_1$ as the fiber optic connector 14 may be optically connected and disconnected during use.

The fiber optic cable 12 may be secured to the housing assembly 29 by disposing the strength members 19(1), 19(2) between a crimp band 32 and a portion 34 of the housing assembly 29. A heat shrink 36 merely inhibits contaminants from entering the fiber optic connector 14 and is not a structural member securing the fiber optic cable 12 longitudinally to the housing assembly 29 of the fiber optic connector 14.

FIG. 1C depicts a mechanical schematic drawing of the mechanical attachments between the fiber optic cable 12 and the fiber optic connector 14 of FIG. 1B. As shown in FIG. 1C, the fiber optic cable 12 may include the optical fiber 10, strength members 19(1), 19(2), and outer jacket 38. The optical fiber 10, strength members 19(1), 19(2), and the outer jacket 38 may move relative to each other. The optical fiber 10 may be attached to the ferrule 16, which may be partially constrained by the housing assembly 29 and may generally move the distance $D_1$ relative to the housing assembly 29 in a direction parallel to an optical axis $A_O$. The strength members 19(1), 19(2) may be constrained to the housing assembly 29 at the crimp band 32. The outer jacket 38 of the fiber optic cable 12 is not secured to the housing assembly 29, but may move longitudinally away from the housing assembly 29.

As the fiber optic cable 12 may be exposed to mechanical bends and thermal cycles, the optical fiber 10 may move a longitudinal distance $D_2$ relative to the strength members 19(1), 19(2) of the fiber optic cable 12. The longitudinal distance $D_2$ movement, also known as "pistoning," may be made possible because of excess fiber length or "EFL" where the fiber optic cable 12 is provided with excess longitudinal length of the optical fiber 10. The EFL may propagate along a length of the fiber optic cable 12 in either direction and thereby cause issues related to optical attenuation.

One potential issue is that the optical fiber 10 may be damaged by sharp bends known as "buckling" when the EFL enters the fiber optic connector causing the movement $D_2$ in the fiber optic connector. For example, a sharp bend may be created in the passage 30 of the fiber optic connector 14. The sharp bend may cause damage to the optical fiber 10 and/or optical attenuation. Another issue may occur if the optical fiber 10 moves the longitudinal distance $D_2$ away from the ferrule 16, and thereby attempts to move the optical fiber 10 away from the ferrule 10, then a tensile force may be created by the optical fiber 10 on the ferrule 16. The tensile force may damage the optical fiber 10 and/or cause optical attenuation. The tensile force may also overcome the spring force $F_S$ which may be only, for example, one (1) to two (2) pounds, to inadvertently disconnect the end portion 24 of the optical fiber 10 from the complementary end portion (not shown) of another optical fiber to thereby optically decouple the fiber optic connector 14, and thereby disable the signal being transmitted through the fiber optic connector 14.

A fiber optic connection is needed that is more resistant to mechanical and thermal changes in the fiber optic cable that can cause tensile forces or buckling of the optical fiber 10 in the fiber optic connector. In this manner, the optical fiber may be less likely to be damaged or inadvertently disconnected, and optical attenuation may be inhibited.

SUMMARY

Embodiments disclosed herein include fiber optic cable demarcations inhibiting movements of optical fibers relative to strength members, and related cable assemblies and methods. By bonding optical fibers to strength members with a bonding agent received into at least one cavity, a demarcation may be formed inside the cable jacket at a cable jacket interface. The at least one cavity may be disposed within a cable jacket of a fiber optic cable and at the cable jacket interface. The demarcation may bond at least one optical fiber and at least one strength member together to inhibit longitudinal movement of the at least one optical fiber relative to the at least one strength member. In this manner, the demarcation may inhibit optical fiber movement within the fiber optic connector, which may cause tensile forces and/or buckling of the optical fiber resulting in optical fiber damage and/or optical attenuation.

In one embodiment, a method of preparing a demarcation for a fiber optic cable is disclosed. The method may include providing a fiber optic cable comprising a cable jacket, at least one optical fiber disposed in the cable jacket, at least one strength member disposed in the cable jacket, and at least one cavity disposed inside the cable jacket. The method may also include removing the cable jacket from an end portion of the fiber optic cable to expose at least one optical fiber from the cable jacket at a cable jacket interface. The method may also include receiving a bonding agent into the at least one cavity disposed within the cable jacket at the cable jacket interface to form a demarcation inside the cable jacket at the cable jacket interface, thus bonding the at least one optical fiber and the at least one strength member together to inhibit longitudinal movement of the at least one optical fiber with respect to the at least one strength member. In this manner, movement of the optical fiber within a fiber optic connector, as well as associated optical fiber damage and/or optical attenuation, may be reduced.

In another embodiment, a connectorized fiber optic cable is disclosed. The connectorized fiber optic cable may include a cable jacket. The connectorized fiber optic cable may also include at least one optical fiber and at least one strength member extending from the cable jacket at a cable jacket interface. The connectorized fiber optic cable may also include a bonding agent disposed in at least one cavity inside the cable jacket at the cable jacket interface to form a demarcation inside the cable jacket at the cable jacket interface. The bonding agent may attach the at least one optical fiber and the at least one strength member together to inhibit longitudinal movement of the at least one optical fiber with respect to the at least one strength member. In this manner, movement of the optical fiber within a fiber optic connector may be reduced and the fiber optic connector is less likely to be disconnected from a complementary fiber optic connector.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 1A is a side cutaway view of an optical fiber being inserted into a ferrule and ferrule holder to illustrate a physical connection between an end portion of the optical fiber of a fiber optic cable and a fiber optic connector in the prior art;

FIG. 1B is a side cutaway view of the ferrule, the ferrule holder, and the optical fiber of FIG. 1A as part of a fiber optic connector subassembly to illustrate extra fiber length (EFL) of the optical fiber entering the fiber optic connector, thereby causing an unwanted buckling in the fiber optic connector in the prior art;

FIGS. 2A and 2B are a perspective partial cutaway view and an exploded perspective view, respectively, of an exemplary connectorized fiber optic cable, including an exemplary fiber optic connector and exemplary fiber optic cable, to illustrate a location of a demarcation of the fiber optic cable;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include fiber optic cable demarcations inhibiting movement of optical fibers relative to strength members, and related assemblies and methods. By bonding optical fibers to strength members with a bonding agent received into at least one cavity, a demarcation may be formed inside the cable jacket at a cable jacket interface. The at least one cavity may be disposed within a cable jacket of a fiber optic cable and at the cable jacket interface. The demarcation may bond at least one optical fiber and at least one strength member together to inhibit longitudinal movement of the at least one optical fiber relative to the at least one strength member. In this manner, the demarcation may inhibit optical fiber movement within the fiber optic connector, which may cause tensile forces and/or buckling of the optical fiber resulting in optical fiber damage and/or optical attenuation.

In this regard, to provide context before discussing specific aspects of the present disclosure relating to fiber optic cable demarcations inhibiting movement of optical fibers relative to strength members, and related assemblies and methods, an exemplary connectorized fiber optic cable, including a fiber optic connector and fiber optic cable including a demarcation, will first be described with respect to FIGS. 2A-6.

Figure 1C:
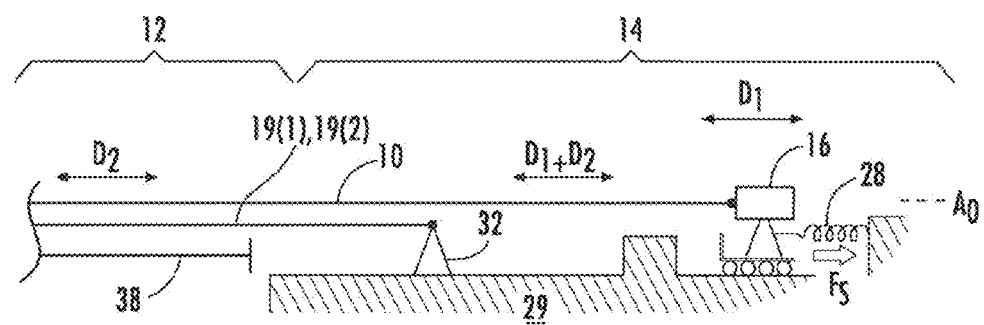
FIG. 1C is a mechanical schematic drawing of attachment relationships of the fiber optic connector subassembly of FIG. 1B; illustrating, that the optical fiber may be attached to the ferrule without being longitudinally secured to a strength member or cable jacket of the fiber optic cable.
Figure 2B:
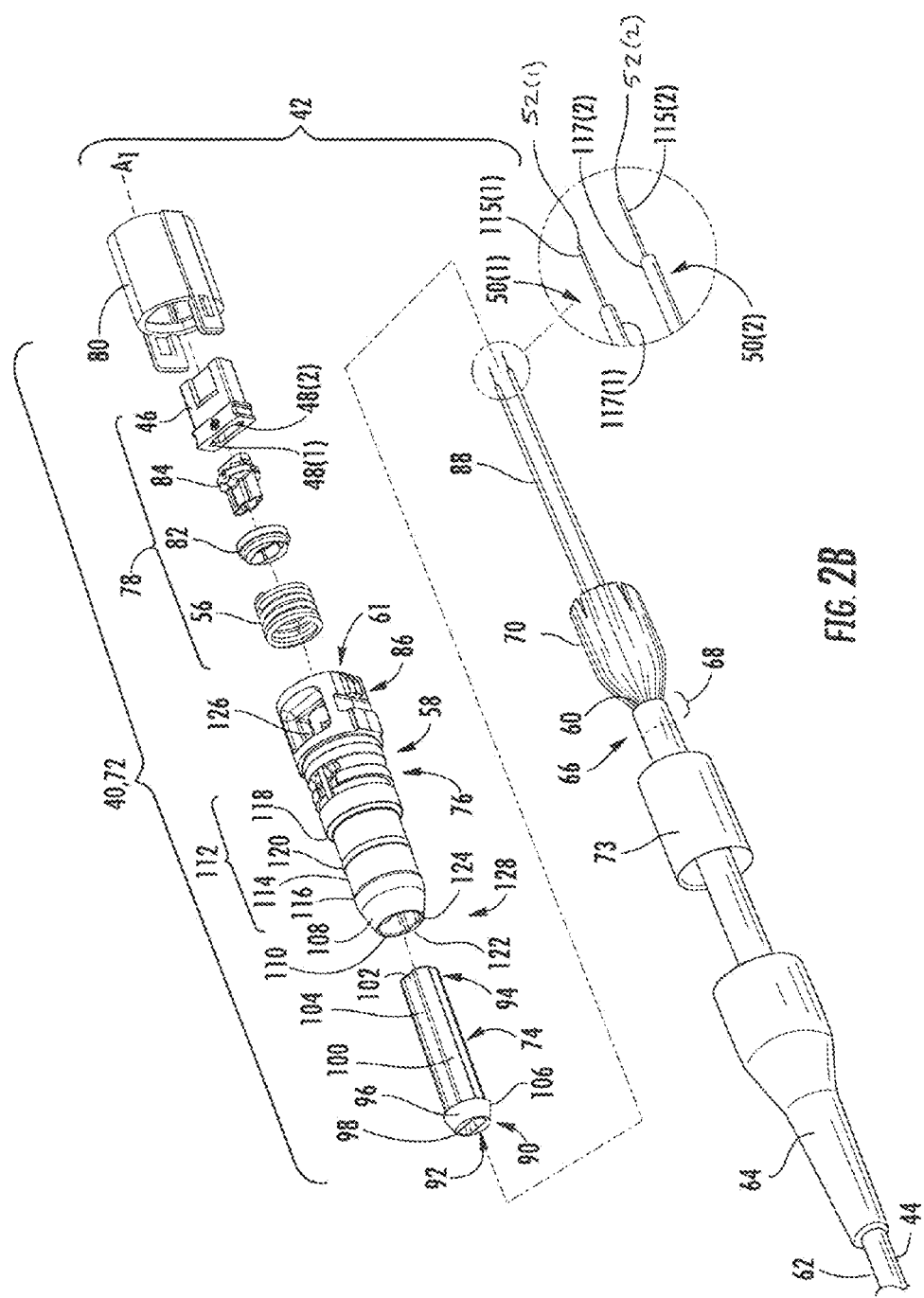

In this regard, FIG. 2A is a perspective partial cutaway view of a fully-assembled example of a fiber optic connector 40 of a connectorized fiber optic cable 42 with a fiber optic cable 44. FIG. 2B shows an exploded perspective view of the fiber optic connector 40 adjacent to the fiber optic cable 44. The fiber optic cable 44 extends to the fiber optic connector 40 where the fiber optic cable 44 may be optically coupled to a complementary fiber optic receptacle (not shown). The fiber optic connector 40 may include a ferrule 46 including at least one ferrule bore 48(1), 48(2) for receiving optical fibers 50(1), 50(2), respectively, from the fiber optic cable 44. The ferrule 46 positions end portions 52(1), 52(2) of the optical fibers 50(1), 50(2) at an end face 54 of the ferrule 46 where the end portions 52(1), 52(2) as depicted in FIG. 3B. At the end face 54 of the ferrule 46 the end portions 52(1), 52(2) may form an optical connection with complementary end portions of complementary optical fibers of a receptacle (not shown). The ferrule 46 may move longitudinally a distance $D_1$ (FIG. 4B) parallel to an optical axis $A_1$ and a spring force $F_S$ may be applied to the ferrule 46 by a spring 56 during the optical connection in order for the end portions 52(1), 52(2) (FIG. 3B) to form the optical connection.

With reference back to FIG. 2B, the spring 56 may be disposed between the ferrule 46 and a housing assembly 58. The housing assembly 58 protects the at least one optical fiber 50(1), 50(2) which extends from a cable jacket interface 60 of the cable jacket 62 of the fiber optic cable 44 into the housing assembly 58. The at least one optical fiber 50(1), 50(2) may be routed through a passage 61 of the housing assembly 58 which guides the optical fiber 50(1), 50(2) to the ferrule 46.

The fiber optic connector 40 may include a boot 64 to inhibit a sharp bend from developing in a transition area 66 of the fiber optic cable 44 adjacent to the fiber optic connector 40. A demarcation 68 may also be located in the transition area 66 of the fiber optic cable 44. As discussed later, the demarcation 68 may inhibit longitudinal movement $D_2$ of at least one optical fiber 50(1), 50(2) relative to at least one strength member 70 in the fiber optic cable 44 to thereby isolate at least a portion of the at least one optical fiber 50(1), 50(2) in the fiber optic connector 40 from this longitudinal movement $D_2$. It is noted that a longitudinal direction is parallel to the optical axis $A_1$ as shown in FIG. 2A.

Figure 3A:
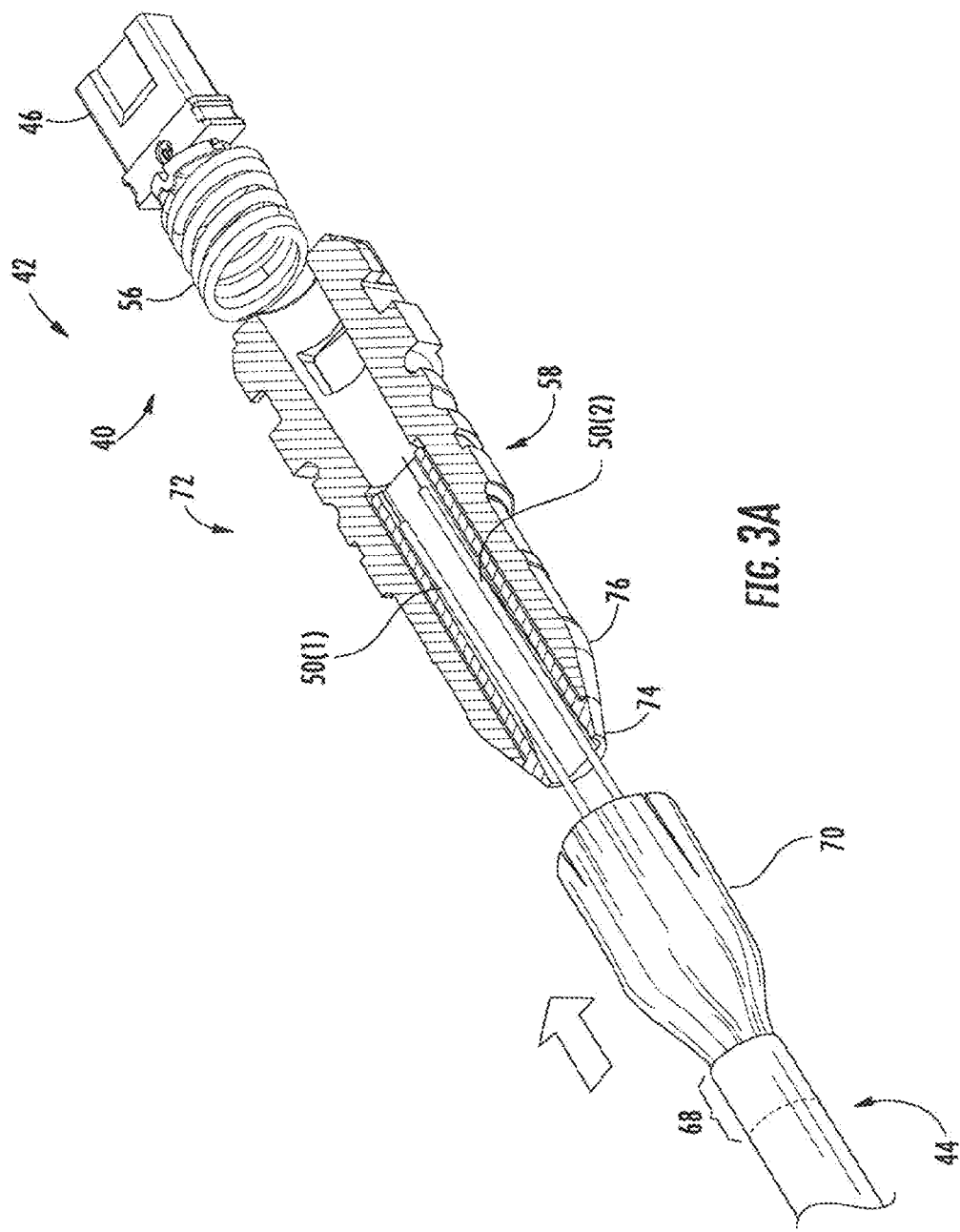
FIG. 3A is a perspective partial cutaway view of the fiber optic connector of FIG. 2A with the fiber optic cable being inserted therein.
Figure 3B:
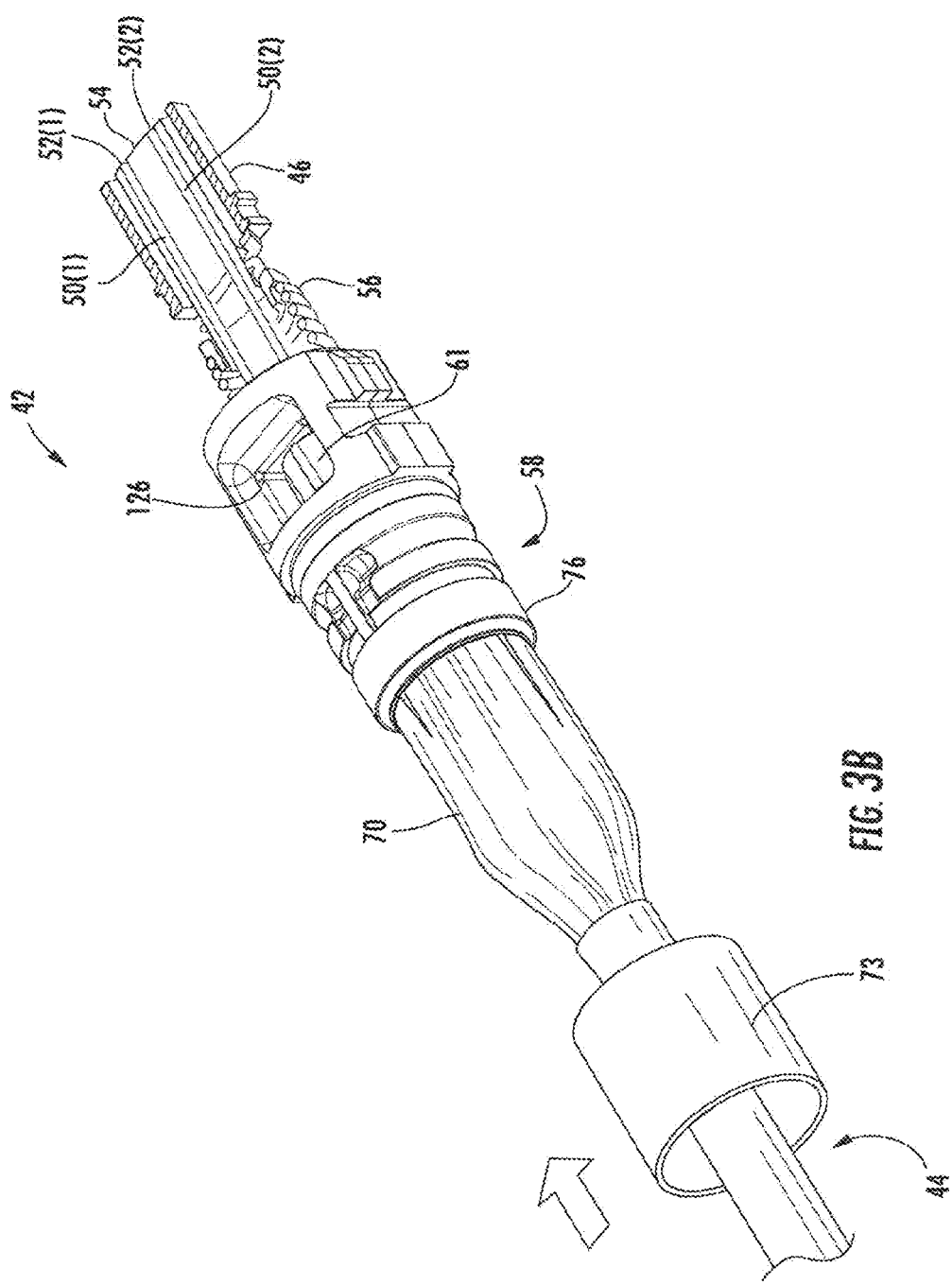
FIG. 3B is a perspective partial cutaway view of the fiber optic connector of FIG. 2A with the fiber optic cable inserted therein and at least one strength member of the fiber optic cable arranged around a portion of the fiber optic connector, illustrating at least one strength member being arranged prior to being secured to the fiber optic connector and optical fibers of the fiber optic cable secured within a ferrule.

FIG. 3A shows a perspective partial cutaway view of a fiber optic connector subassembly 72 of the fiber optic connector 40 connected to a fiber optic cable 44 with the demarcation 68. As will be discussed in more detail later in relation to FIG. 4C, the fiber optic cable 44 includes the demarcation 68 inhibiting longitudinal movement $D_2$ of the optical fiber 50(1), 50(2) in the fiber optic cable 44 from reaching a passage 61 of the fiber optic connector 40 where a longitudinal movement $D_1$ of the ferrule 46 may be restricted within the housing assembly 58. The demarcation 68 inhibits the longitudinal movement $D_2$ of the optical fiber 50(1), 50(2) from entering into the passage 61, where the longitudinal movement $D_2$ may cause sharp bends in the optical fiber 50(1), 50(2) and thereby damaging the optical fiber 50(1), 50(2). Alternatively, if the passage 61 is not isolated from the longitudinal movement $D_2$ of the optical fiber 50(1), 50(2) in the fiber optic cable 44, tensile forces may be created on the ferrule 46 in a longitudinal direction opposite to the spring force $F_S$ that might disengage the fiber optic connector 40 from a complementary fiber optic connector (not shown).

With reference back to FIG. 2B, the connectorized fiber optic cable 42 is described in more detail. The connectorized fiber optic cable 42 includes at least the boot 64, the fiber optic cable 44, a crimp band 73 and the fiber optic connector subassembly 72. The fiber optic connector subassembly 72 includes at least an optical fiber guide insert 74, a crimp body 76, a fiber optic ferrule assembly 78, and an inner housing 80 of the housing assembly 58. The fiber optic ferrule assembly 78 may include the spring 56, a spring centering cuff 82, a ferrule boot 84 and the ferrule 46 which may include the at least one ferrule bore 48(1), 48(2) to secure at least one optical fiber 50(1), 50(2) therein. The fiber optic ferrule assembly 78 may be secured to a front end of the crimp body 76 by the inner housing 80. In this manner, the ferrule 46 may move a longitudinal distance $D_1$ (FIG. 2A) to form the optical connection with a complementary receptacle (not shown).

The boot 64 may be adapted, for example, to translate longitudinally about the fiber optic cable 44 and provide strain relief to the fiber optic cable 44 at the transition area 66. The boot 64 may be, for example, molded prior to assembly to the fiber optic cable 44 and that may be secured to the fiber optic cable 44 and the fiber optic connector subassembly 72 using an adhesive, for example, epoxy. Alternatively, the boot 64 may be over-molded to fiber optic cable 44 and the fiber optic connector subassembly 72 using an over-molding process. In exemplary embodiments, the boot 64 may be a heat-shrinkable boot comprising, for example, a polyolefin.

The fiber optic cable 44 may include, for example, the cable jacket 62 including an outer surface with a circular shaped cross-section, but may alternately be square, rectangular, oval, or dog-bone shaped. The cable jacket 62 may include an inner surface 63 (FIGS. 5 and 6) facing the at least one optical fiber 50(1), 50(2). The fiber optic cable 44 may include, for example, the at least one optical fiber 50(1), 50(2) including at least a portion of the at least one optical fiber 50(1), 50(2) free of attachments from each other or converted into, for example, a ribbon (not shown). The fiber optic cable 44 may include the at least one strength member 70 that may be selected from the group consisting of fiberglass, aramid fibers or yarns, steel mesh, and carbon fibers. It is noted that aramid fibers or yarns may comprise Kevlar. In non-limiting exemplary embodiments, the at least one strength member 70 may include 1500-17000 decitex fiberglass fibers.

The crimp band 73 may be generally tubular, having a length and a width and a wall thickness, for example, of 9.0 mm, 8.5 mm, and 0.35 mm, respectively. The crimp band 73 may be made from a malleable metal alloy selected from the group consisting of brass, bronze, steel, lead, copper, aluminum, tin, zinc, iron, and nickel, though other malleable materials are possible.

An optical fiber guide insert 74 may be inserted into the crimp body 76. The optical fiber guide insert 74 may be adapted to receive the at least one optical fiber 50(1), 50(2) as shown in FIG. 3A which is a perspective partial cutaway of the fiber optic connector 40. Alternatively the optical fiber guide insert 74 may be, for example, configured to receive a plurality of optical fibers in the form of the ribbon (not shown).

With reference back to FIG. 2B, the optical fiber guide insert 74 may include, for example, a first end 90, a through passage 92, a second end 94, a transition surface 96, a fiber entrance 98, at least one contact surface 100, a fiber exit 102, at least one alignment slot 104, and an abutment surface 106. The through passage 92 passes from the fiber entrance 98 on first end 90 to the fiber exit 102 on the second end 94. The through passage 92 may include a first height and a first width at fiber entrance 98 and a second height and a second width at the fiber exit 102. The height of through passage 92 in an insertion direction of the at least one optical fiber 50(1), 50(2) may change from about 1.9 mm to about 0.7 mm, while the widths of the through passage 92 may change from about 3.5 mm to about 3.1 mm.

The transition surface 96 may be adjacent to the first end 90, and may be a substantially tapered, or frustoconical, surface. The abutment surface 106 may be adjacent to the transition surface 96, and may at least partially face the second end 94. The abutment surface 106 may include an insertion stop. The at least one alignment slot 104 configured to rotationally align the optical fiber guide insert 74 within the crimp body 76, extends longitudinally along the exterior of the optical fiber guide insert 74, substantially from the abutment surface 106 to the second end 94.

The at least one contact surface 100 may extend longitudinally along the exterior of the optical fiber guide insert 74, substantially from the abutment surface 106 to the second end 94. In exemplary embodiments, the optical fiber guide insert 74 may include two (2) of the contact surfaces 100. In further exemplary embodiments, the optical fiber guide insert 74 may include four (4) of the contact surfaces 100. The at least one contact surface 100 may include a taper to facilitate, for example, a friction fit.

The optical fiber guide insert 74 may comprise a thermoplastic elastomer with Shore D hardness from about seventy (70) to about ninety (90). Exemplary embodiments may include Hytrel®, available from DuPont™, a thermoplastic elastomer with Shore D hardness of about eighty-two (82); however, other suitable elastomeric polymers may be used.

With continuing reference to FIG. 2B, housing assembly 58 may comprise the crimp body 76. The crimp body 76 may include, for example, a transition surface 108, an insert receiving area 110, and a crimp zone 112. The crimp zone 112 may include at least one compression area 114, a rearward step 116, a forward step 118 and at least one hoop 120. The crimp body 76 may further include at least one alignment key 122 located within the insert receiving area 110, an abutment surface 124 and a fiber access aperture 126.

The crimp body 76 may be adapted to, for example, mechanically interlock to the crimp band 73 for securing the at least one strength member 70 of the fiber optic cable 44 on the rear end 128, and may be further adapted to receive the inner housing 80 to the front end 86. The insert receiving area 110 may be adapted to receive optical fiber guide insert 74. At least a portion of the insert receiving area 110 may include a tapered interior surface that cooperates with the contact surface 100 of the optical fiber guide insert 74. The at least one alignment key 122 may communicate with the at least one alignment slot 104 found on the optical fiber guide insert 74. The at least one alignment key 122 may be configured to interfere with the at least one alignment slot 104 to cause a tight interference fit between the optical fiber guide insert 74 and the crimp body 76. The abutment surface 124 may be located adjacent to the transition surface 108. When the optical fiber guide insert 74 is inserted into the crimp body 76, the abutment surface 106 may substantially abut against the abutment surface 124, stopping any further insertion. The transition surface 96 found on the optical fiber guide insert 74 conforms to the transition surface 108, creating a substantially contiguous transition surface as shown in FIG. 2B for easing the at least one strength member 70 of the fiber optic cable 44 onto the compression area 114 (FIG. 3B).

Figure 4A:
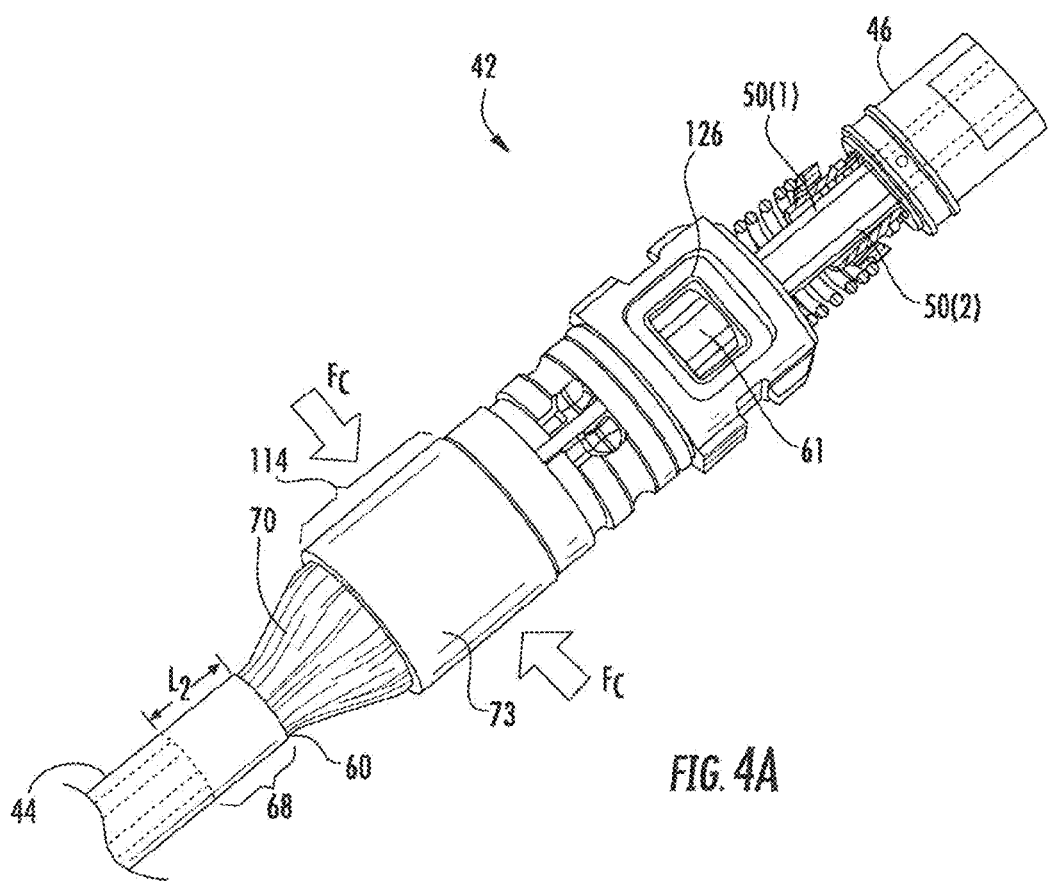
FIG. 4A is a perspective partial cutaway view of the fiber optic connector of FIG. 2A with the at least one strength member of the fiber optic cable secured thereto.

As shown in FIG. 4A, the compression area 114 may receive a compressive force $F_C$ from the crimp band 73. In an example shown in FIG. 2B, the at least one hoop 120 may be located between the at least one pair of compression areas 114. In yet another exemplary embodiment, multiple ones of the hoops 120 may be located among multiple ones of the compression area 114. The at least one hoop 120 can have an external width, or diameter, which may be greater than the external width of the at least one compression area 114. The external width of the hoop 120 may be, for example, about 7.90 mm. The external width of the at least one compression area 114 may be, for example, about 7.70 mm. The at least one hoop 120 may include slanted side walls at an angle of about one-hundred thirty-five (135) degrees relative to a longitudinal axis $A_1$ of the crimp body 76. In this manner, the at least one strength member 70 of the fiber optic cable 44 may be secured to the fiber optic connector 40.

As the fiber optic cable 44 includes the demarcation 68, the movement $D_2$ of the at least one optical fiber 50(1), 50(2) relative to the strength members 70(1), 70(2) outside the fiber optic connector 40 may be inhibited by the demarcation 68 from entering the crimp body 76 of the fiber optic connector 40. In this manner, sharp bends which may damage the at least one optical fiber 50(1), 50(2) and/or cause optical attenuation may be inhibited from forming within the fiber optic connector 40.

Figure 4B:
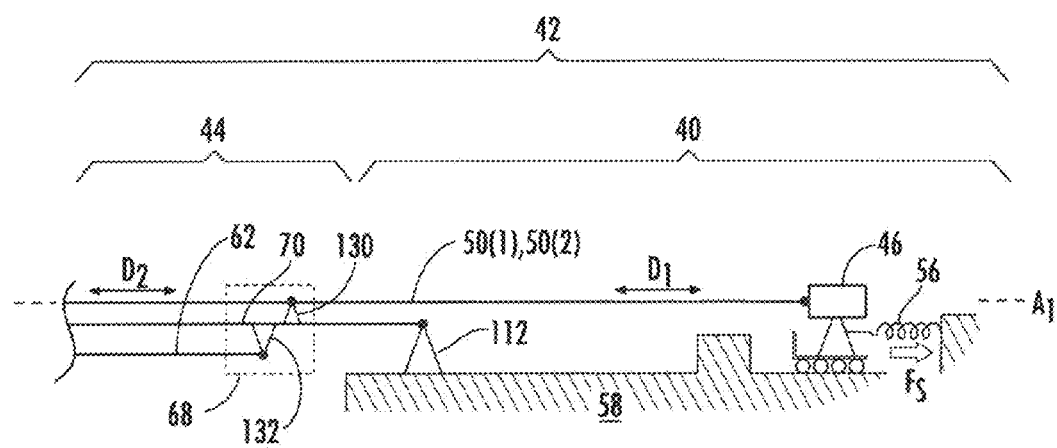
FIG. 4B is a mechanical schematic drawing of attachment relationships of the fiber optic connector subassembly of FIG. 2B; illustrating that the demarcation may secure the at least one strength member to the at least one optical fiber with a primary connection and the cable jacket of the fiber optic cable with a secondary connection.

FIG. 4B is a schematic mechanical drawing of the connectorized fiber optic cable 42 of FIG. 2A providing details of the exemplary interface between the fiber optic connector 40 and the fiber optic cable 44. The fiber optic cable 44 may include the optical fiber 50(1), 50(2), the at least one strength member 70, and the cable jacket 62. Outside of the demarcation 68 and the fiber optic connector 40, the at least one optical fiber 50(1), 50(2), the at least one strength member 70, and the outer jacket 38 may move relative to each other. The at least one optical fiber 50(1), 50(2) of the fiber optic cable 44 may be secured to the ferrule 46, which may be partially constrained by the housing assembly 58. The ferrule 46 may generally move the distance $D_1$ relative to the housing assembly 58 in a direction parallel to the longitudinal axis $A_1$. The at least one strength member 70 may be constrained to the housing assembly 58 at the crimp zone 112. The cable jacket 62 of the fiber optic cable 12 may or may not be secured to the housing assembly 58. However, at the demarcation 68, the at least one strength member 70 may be secured to the at least one optical fiber 50(1), 50(2) with a primary attachment 130. Moreover, the at least one strength member 70 may be secured to the cable jacket 62 of the fiber optic cable 44 with a secondary attachment 132.

Figure 4C:
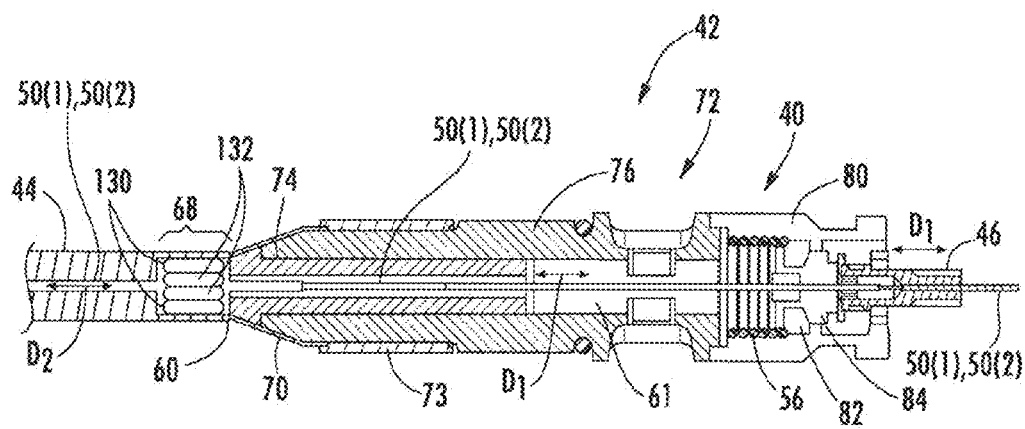
FIG. 4C is a side cross-sectional view of an exemplary connectorized fiber optic cable of FIG. 2A, illustrating the demarcation with the primary connection and the secondary connection of FIG. 4B.

FIG. 4C is a side cross-sectional view of the connectorized fiber optic cable 42 of FIG. 2A, illustrating the demarcation 68 with the primary attachment 130 and the secondary attachment 132. The demarcation 68 may be located adjacent to the fiber optic connector 40 primary connection of FIG. 4B.

Now that the details of an exemplary interface between the fiber optic connector 40 and the fiber optic cable 44 have been introduced above, details of the demarcation 68 are provided below. The demarcation 68 is configured to isolate the fiber optic connector 40 from the longitudinal movement $D_2$ of the at least one optical fiber 50(1), 50(2) in the fiber optic cable 44 relative to the at least one strength member 70. In this manner, the ferrule 46 may be isolated from tensile forces that may disengage the fiber optic connector 40 from the complementary connector (not shown).

Figure 4D:
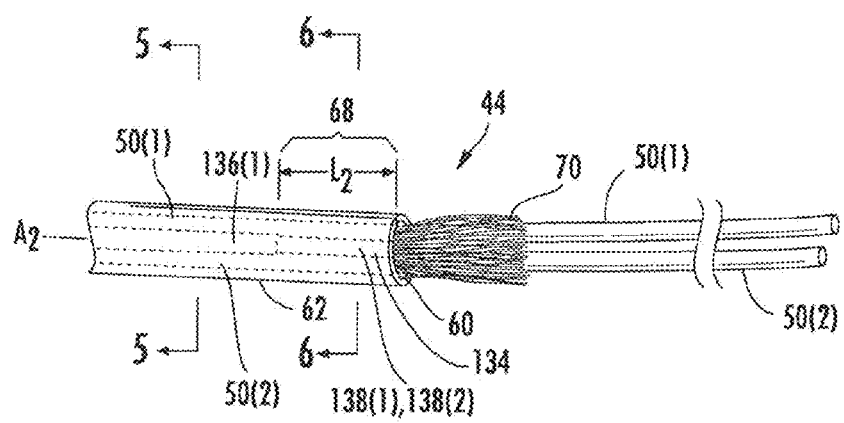
FIG. 4D is a side view of the fiber optic cable of FIG. 2A detached from the fiber optic connector.
Figure 5:
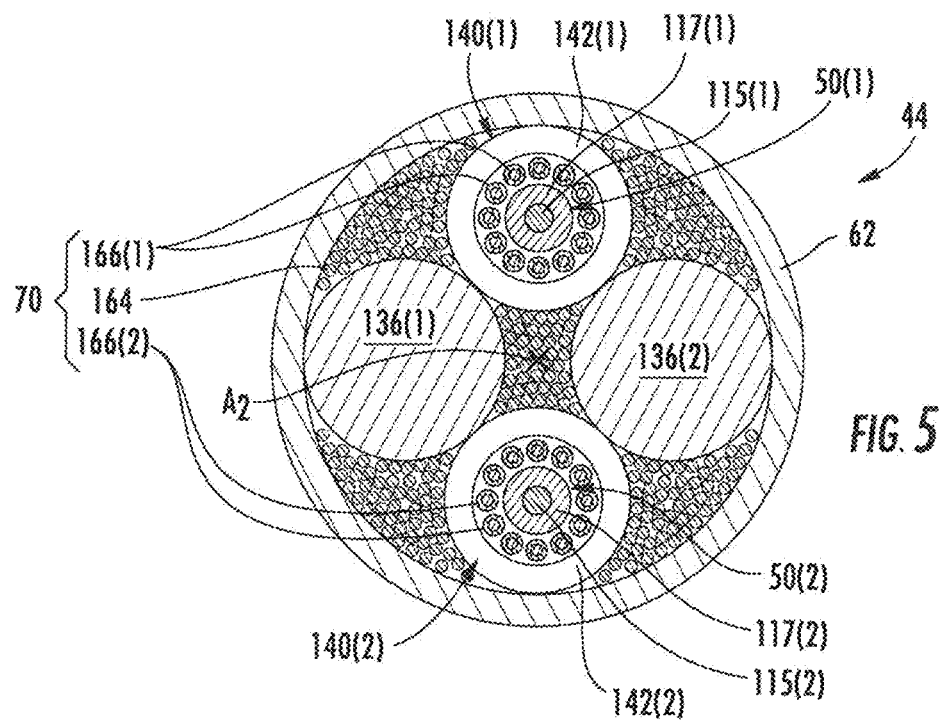
FIG. 5 is a cross section of the fiber optic cable of FIG. 4 showing the at least one optical fiber, at least one strength member, and at least one filler unit outside the demarcation, illustrating features outside the demarcation where the EFL may propagate.
Figure 6:
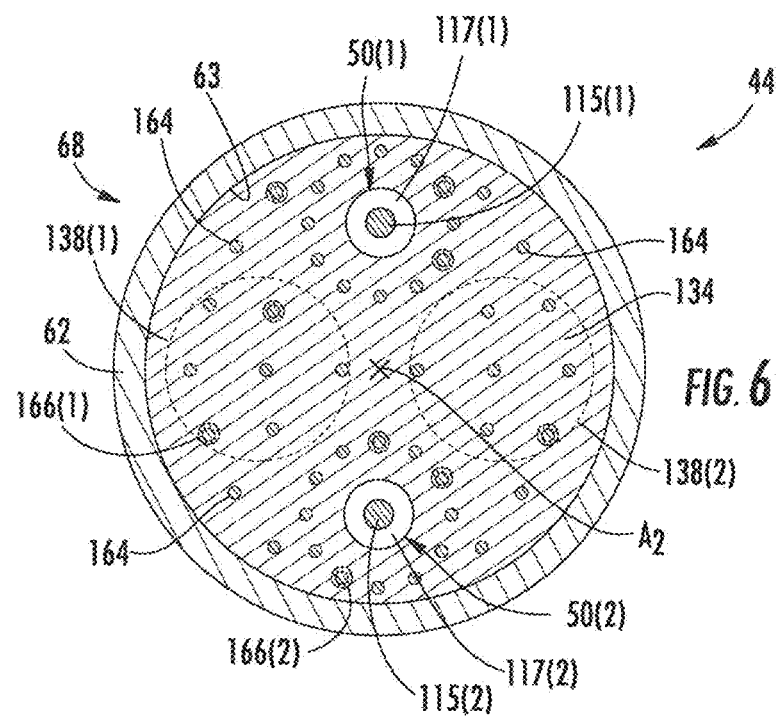
FIG. 6 is a cross section of the fiber optic cable of FIG. 4 at the demarcation showing the at least one fiber subunit stripped of its fiber subunit jacket, the filler units removed, and the strength members from the fiber subunit and the fiber optic cable jacket twisted together and bonded to inhibit EFL from entering into or departing from the fiber optic connector.

In this regard, FIGS. 4D, 5 and 6 are a side view and two cross-sections, respectively, of the fiber optic cable 44 of FIG. 2A. The fiber optic cable 44 may include a cable jacket 62, at least one optical fiber 50(1), 50(2), and at least one strength member 70. The at least one optical fiber 50(1), 50(2) and the at least one strength member 70 may extend from the cable jacket 62 at the cable jacket interface 60, which may abut against the fiber optic connector 40 (FIG. 4C). In this manner, the optical fibers 50(1), 50(2) and the strength member 70 may be available to be connected to the fiber optic connector 40. The strength member 70 may secure the fiber optic connector 40 to the fiber optic cable 44 using, for example, cohesion, adhesion, and/or a mechanical attachment.

A bonding agent 134 may be disposed in at least one cavity 138(1), 138(2) inside the cable jacket 62 (see FIG. 6) at the cable jacket interface 60 (see FIG. 4D) to form a demarcation 68 inside the cable jacket 62 at the cable jacket interface 60. The optical fibers 50(1), 50(2) and the at least one strength member 70 may contact the bonding agent 134 within the demarcation 68. In this manner, the bonding agent 134 may attach the optical fibers 50(1), 50(2) and the strength member 70 together to inhibit longitudinal movement $A_2$ of the optical fibers 50(1), 50(2) relative to the strength member 70 in the fiber optic cable 44 from moving the optical fibers 50(1), 50(2) in the fiber optic connector 40.

The bonding agent 134 may comprise, for example, at least one adhesive and/or cohesive. The adhesive may include a thermoplastic adhesive, for example, comprising ethylene-vinyl acetate (EVA). The bonding agent 134 may be applied as a solid or non-solid, for example, as a solid glue stick. The bonding agent 134 may be configured to attach to the optical fibers 50(1), 50(2) and the strength member 70. The bonding agent 134 may include a material with a melting point, for example, greater than one-hundred fifty (150) degrees Celsius to form the attachment after being melted and cooled. In this manner, the bonding agent 134 may not be vulnerable to melting during expected operating temperatures of the connectorized fiber optic cable 42.

As shown in FIGS. 4D-6, the fiber optic cable 44 may further include at least one filler unit 136(1), 136(2) and at least one cavity 138(1), 138(2) disposed between the at least one filler unit 136(1), 136(2) and the cable jacket interface 60. The at least one cavity 138(1), 138(2) may be less than fifteen (15) millimeters in the longitudinal direction $A_2$ as designated by the longitudinal length $L_2$ of the demarcation 68, but any suitable length is possible. The filler unit 136(1), 136(2) may comprise at least one filler rod, at least one aramid strength member, and/or "dummy" optical fibers which are not intended to carry an optical signal.

Alternatively, it is noted that some examples of the fiber optic cable 44 may include sufficient internal empty space within the cable jacket 62 to form the at least one cavity 138(1), 138(2) as discussed herein without the at least one filler unit 136(1), 136(2) disposed within the fiber optic cable 44. In this manner, the bonding agent 134 may be received in the at least one cavity 138(1), 138(2) as formed by the sufficient internal empty space and the demarcation 68 may be created by attaching the optical fibers 50(1), 50(2) to the at least one strength member 70 with the bonding agent 134.

As shown in FIG. 5, the optical fibers 50(1), 50(2) of the fiber optic cable 44 may be included as part of one of at least one fiber subunit 140(1), 140(2) which may include at least one fiber subunit jacket 142(1), 142(2), respectively. The fiber subunit jackets 142(1), 142(2) may further protect the optical fibers 50(1), 50(2) within the fiber subunits 140(1), 140(2). The at least one strength member 70 may comprise a first portion, including at least one strength member 164, disposed between the fiber subunit jacket 142(1), 142(2) and the cable jacket 62. The at least one strength member 70 may also include a second portion, including at least one strength member 166(1), 166(2), which may be part of the at least one fiber subunit 140(1), 140(2) and disposed in the fiber subunit jacket 142(1), 142(2), respectively. In this manner, the optical fibers 50(1), 50(2) may be independently strengthened within the fiber subunits 140(1), 140(2).

FIG. 6 is a cross section of the fiber optic cable 44 of FIG. 4D at the demarcation 68. The at least one strength member 70 may be optionally twisted together as depicted by a random distribution of the at least one strength member 70, depicted as the strength members 166(1), 166(2), 164, within the demarcation 68. The optional twisting may create complex interrelationships between the at least one strength member 70 within the demarcation 68, which, when bonded together by the bonding agent 134, may form a more secure attachment between the at least one strength member 70 and the optical fibers 50(1), 50(2) to form the primary attachment 130 depicted in FIG. 4C. FIG. 6 also shows that the at least one strength member 70 may optionally be attached to the inner surface 63 of the cable jacket 62 to form the secondary attachment 132 also depicted in FIG. 4C. In this manner, the longitudinal movement $D_2$ of the at least one optical fiber 50(1), 50(2) in the fiber optic cable 44 may be isolated from the passage 61 (FIG. 4C) of the fiber optic connector 40 to thereby reduce the incidence of buckling of the at least one optical fiber 50(1), 50(2) which may cause optical attenuation.

Attaching as used herein in relation to the bonding agent 134 means that the optical fiber 50(1), 50(1), the cable jacket 62, and/or any other feature of the fiber optic cable 44 disposed in the demarcation 68, are attached to the at least one strength member 70 according to a bond so that they do not detach from one another. In order for a feature of the fiber optic cable 44 to be attached with at least one strength member 70 with the bonding agent 134, then the bonding agent 134 will be in direct contact with both the feature of the fiber optic cable 44 and the at least one strength member 70. The bond may be formed by a mechanical lock wherein the bonding agent 134 may encapsulate or flow into holes and other surface features of the at least one strength member 70 and/or the fiber optic cable 44 within the demarcation 68 before solidifying. Alternatively, the bond may be derived from melt and/or chemical adhesion or cohesion between surfaces of the at least one strength member 70 and/or the other feature of the fiber optic cable 44 within the demarcation 68. The bond may be formed, for example, through the addition of heat and/or utilization of overmold technology. In this manner, the optical fiber 50(1), 50(1), the cable jacket 62, or any other feature of the fiber optic cable 44 disposed in the demarcation 68 may be attached to the at least one strength member 70 with the bonding agent 134.

Figure 7:
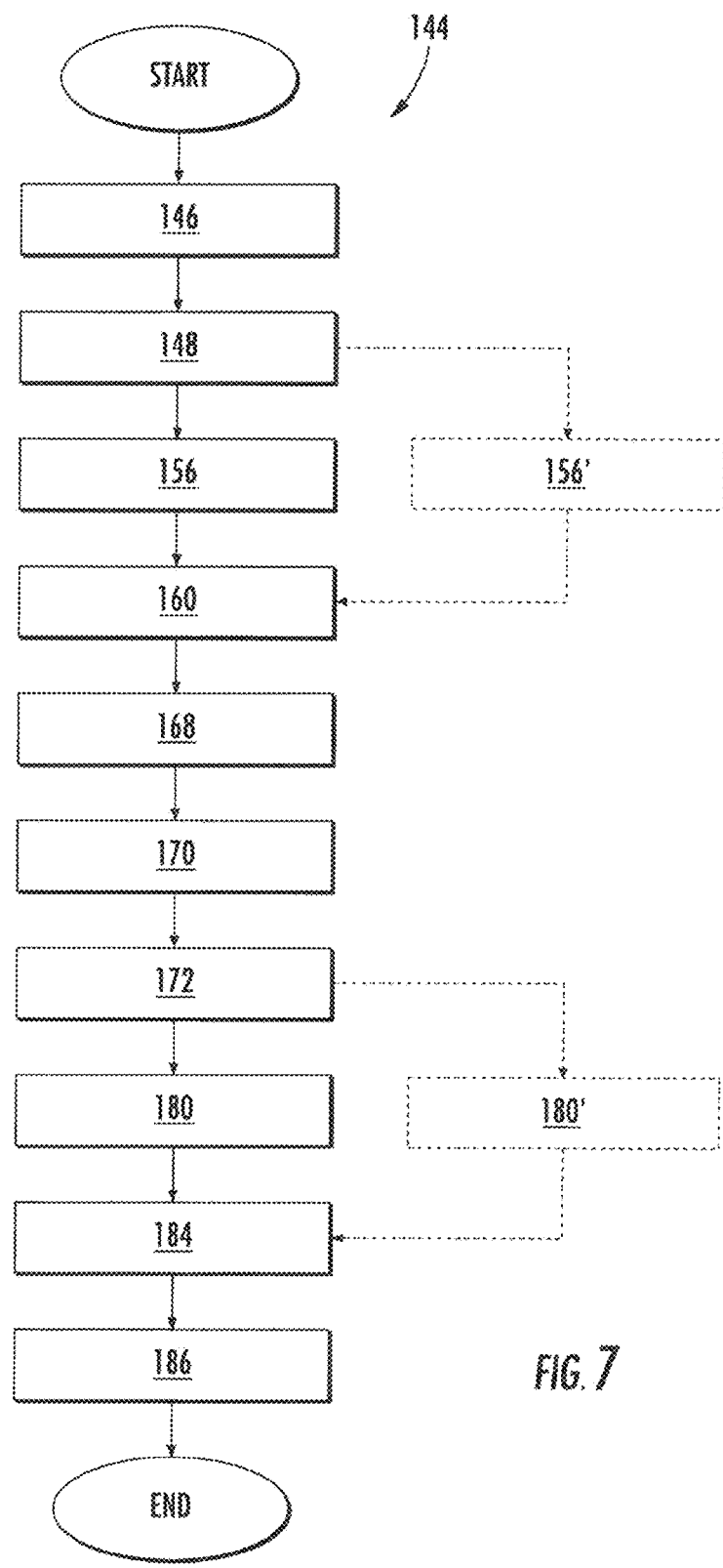
FIG. 7 is a flowchart diagram of an exemplary process of preparing a demarcation for a fiber optic cable.

FIG. 7 is a flowchart diagram of an exemplary process 144 for preparing the demarcation 68 for the fiber optic cable 44. The process 144 in FIG. 7 will be described using the terminology and information provided above.

As shown in FIG. 5, the process 144 may include providing the fiber optic cable 44 including the cable jacket 62, the at least one optical fiber 50(1), 50(2) disposed in the cable jacket 62, and the at least one strength member 70 disposed in the cable jacket 62 (step 146 in FIG. 7). The at least one optical fiber 50(1), 50(2) may include at least one bare optical fiber 115(1), 115(2) which may be surrounded by at least one buffer layer 117(1), 117(2). The at least one optical fiber 50(1), 50(2) may be part of one of at least one fiber subunit 140(1), 140(2). The at least one strength member 70 may comprise the first portion, including the strength member 164, disposed between the fiber subunit jacket 142(1), 142(2) and the cable jacket 62. The at least one strength member 70 may also include the second portion, including the strength member 166(1), 166(2), which may be part of the at least one fiber subunit 140(1), 140(2) and disposed in the fiber subunit jacket 142(1), 142(2), respectively. In this manner, the optical fibers 50(1), 50(2) may be independently strengthened within the fiber subunits 140(1), 140(2).

Figure 8:
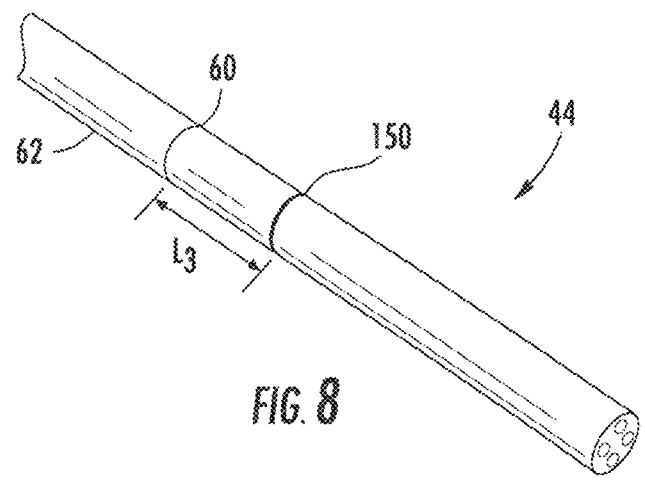
FIG. 8 is a perspective view of the fiber optic cable of FIG. 4 with the cable jacket scored in two (2) locations to form two (2) removable portions of the cable jacket to illustrate preparing the cable jacket for removal.
Figure 9:
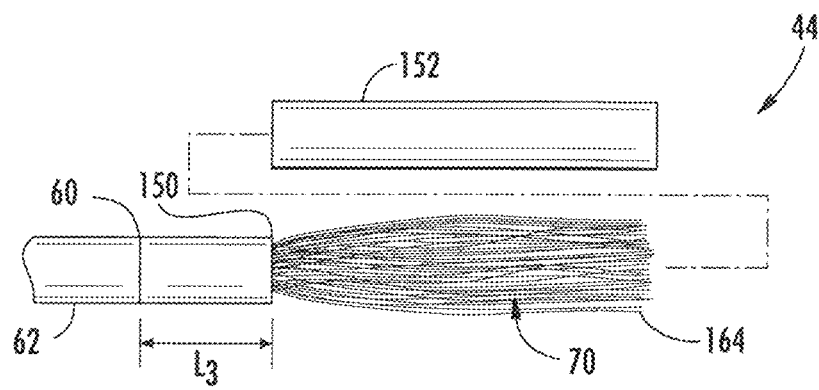
FIG. 9 is a side view of the fiber optic cable of FIG. 8 with one portion of the cable jacket removed, illustrating exposing strength members of the fiber optic cable for removal.
Figure 10:
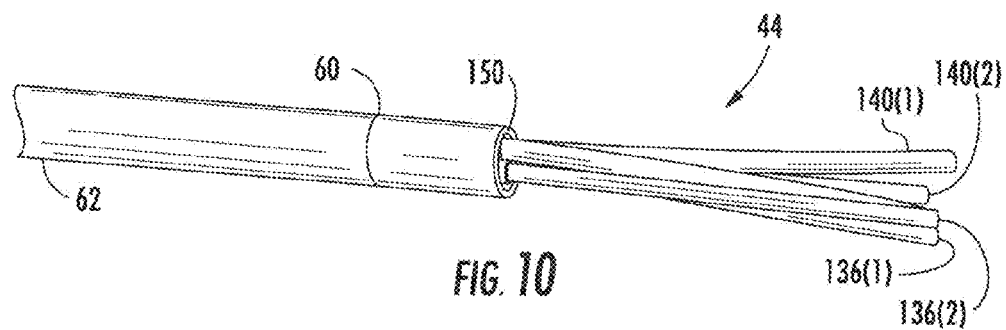
FIG. 10 is a perspective view of the fiber optic cable of FIG. 9 with the exposed strength members removed up to a location of the first score, illustrating the fiber subunits and the strength members within the fiber optic cable.
Figure 11:
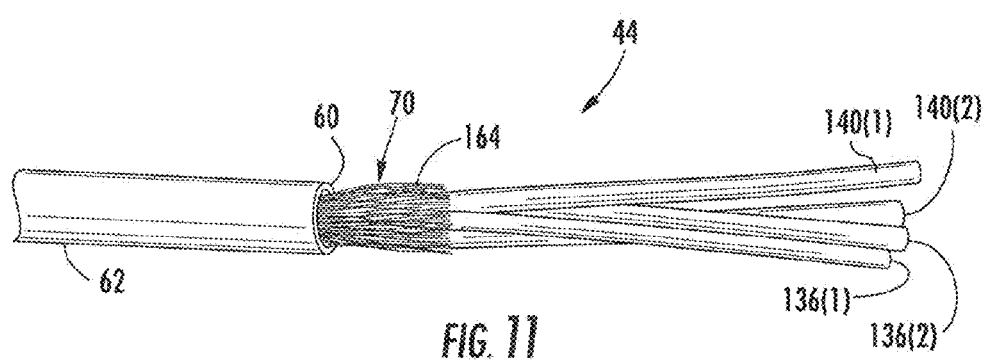
FIG. 11 is a perspective view of the fiber optic cable of FIG. 10 with a second portion of the fiber optic cable jacket removed, illustrating strength members exposed and cut to a final length.

As shown in FIG. 8, the process 144 may also include forming the cable jacket interface 60 by ring cutting the cable jacket 62 (step 148 in FIG. 7). The cable jacket interface 60 may be used as a datum to measure other dimensions, for example, the longitudinal length $L_3$ of the strength member 70 protruding from the cable jacket 62. A second ring cut 150 may be made in the cable jacket 62 at the longitudinal distance $L_3$ from the cable jacket interface 60. A portion 152 of the cable jacket 62 may be removed from the second ring cut 150, as shown in FIG. 9, to expose the at least one strength member 70. The at least one strength member 70 may be removed using a cutting tool (not shown) up to the second ring cut 150 as shown in FIG. 10. After the strength member 70 is cut, the strength member 70 may now be at the final length $L_3$ of the at least one strength member 70 extending from the cable jacket interface 60, as shown in FIG. 11 once another portion of the cable jacket 62 may be removed.

Figure 12:
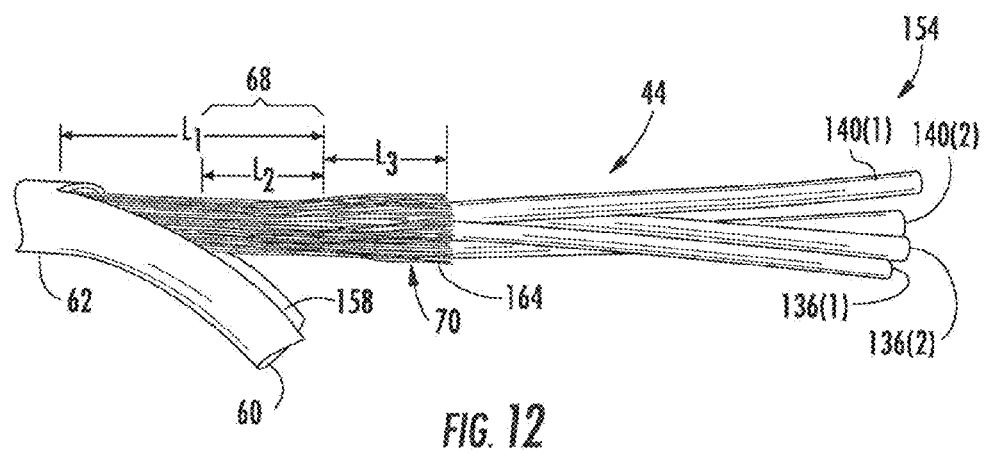
FIG. 12 is a side view of the fiber optic cable of FIG. 11 with the cable jacket cut temporarily along a longitudinal length $L_1$ to facilitate the formation of the demarcation.

As shown in FIG. 12, the process 144 may also include removing the cable jacket 62 from an end portion 154 of the fiber optic cable 44 to expose the at least one optical fiber 50(1), 50(2) from the fiber optic cable 44 at the cable jacket interface 60 (step 156 in FIG. 7). The removal may be temporary and the temporary removal may be facilitated by at least one longitudinal cut 158 which may be the longitudinal length $L_1$ from the cable jacket interface 60. The longitudinal length $L_1$ may be less than fifteen (15) millimeters, but other lengths are possible.

Figure 13:
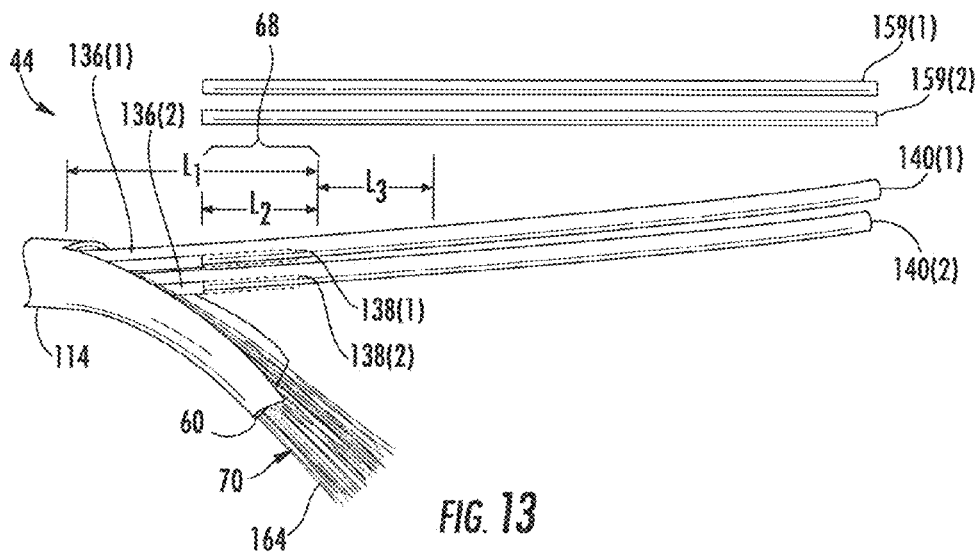
FIG. 13 is a side view of the fiber optic cable of FIG. 12 with filler units being cut a distance $L_2$ from the cable jacket interface, creating at least one cavity in the demarcation.

As shown in FIG. 13, the process 144 may also include removing at least one portion 159(1), 159(2) of each of the at least one filler unit 136(1), 136(2) to form the at least one cavity 138(1), 138(2), which may be the longitudinal length $L_2$ (step 160 in FIG. 7). The at least one optical fiber 50(1), 50(2) within the at least one fiber subunit 140(1), 140(2) depicted in FIG. 13 may remain extended within the fiber optic cable 44 without removal.

Figure 14:
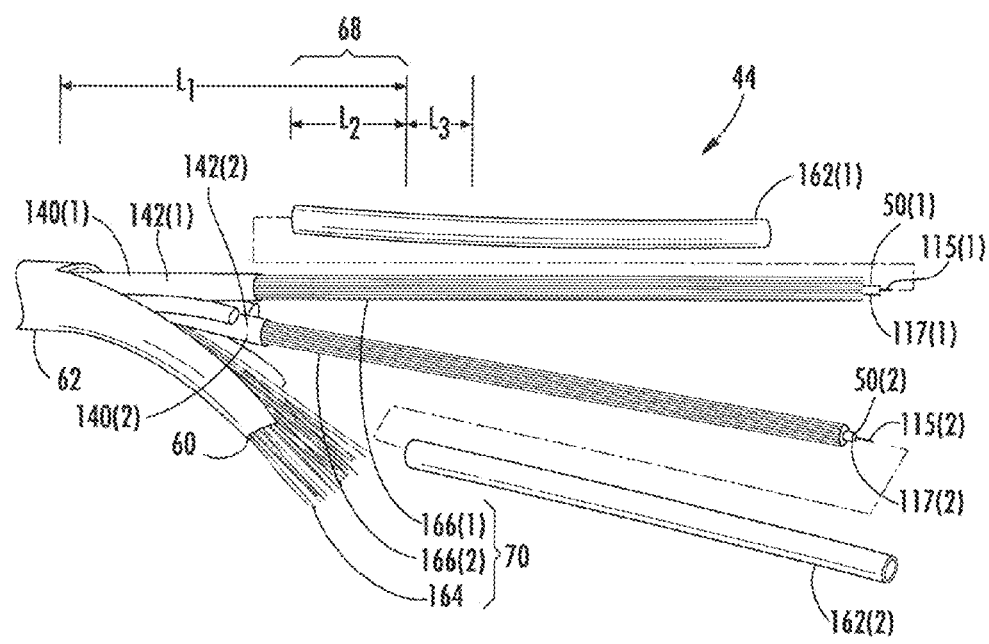
FIG. 14 is a side view of the fiber optic cable of FIG. 13 with the fiber subunit jacket removed up to a point of a distance $L_2$ from the cable jacket interface, illustrating exposing the strength members of the fiber subunit.
Figure 15:
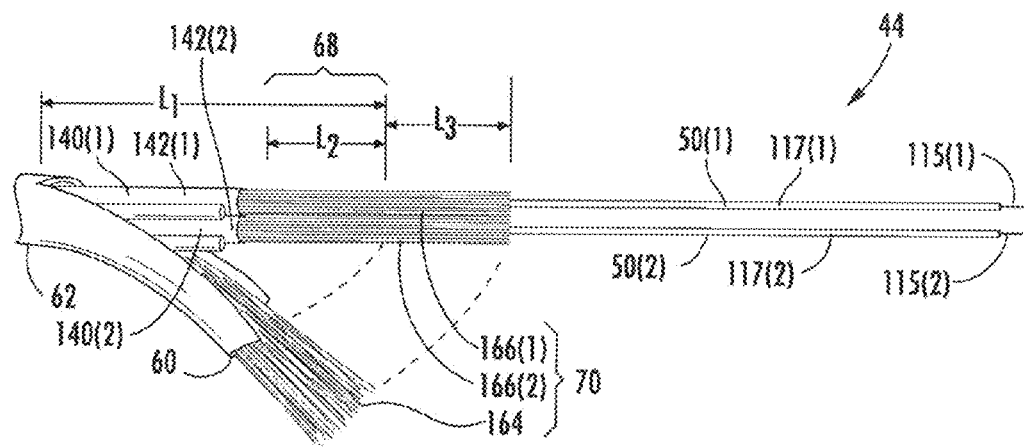
FIG. 15 is a side view of the fiber optic cable of FIG. 14 with the strength members of the fiber subunits cut to the same length as the strength members of the fiber optic jacket.
Figure 16:
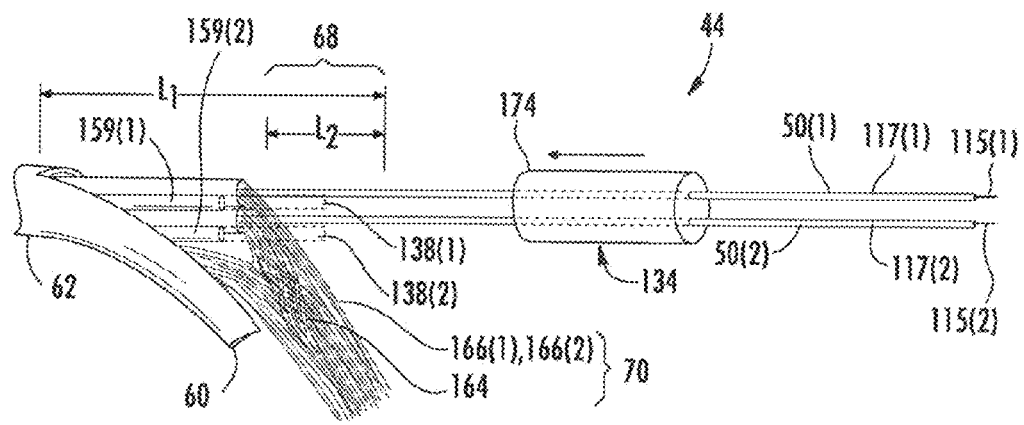
FIG. 16 is a side view of the fiber optic cable of FIG. 15 with the strength members of the fiber subunits and the strength members of the fiber optic jacket being twisted together and a glue stick tube being threaded over the optical fibers of the fiber optic cable.

As shown in FIGS. 14 and 15, the process 144 may also include removing at least one portion 162(1), 162(2) of the fiber subunit jacket 142(1), 142(2) to expose the second portion of the strength members 70, including the strength members 166(1), 166(2) (step 168 of FIG. 7). In this way, the at least one optical fiber 50(1), 50(2) and the second portion of the at least one strength member 70, including strength members 166(1), 166(2), may be freed from the at least one fiber subunit 140(1), 140(2) in the demarcation 68. FIG. 15 shows that the strength member 166(1), 166(2) may be cut to the longitudinal length $L_3$ from the cable jacket interface 60. As shown in FIG. 16, the process 144 may also include optionally twisting together the first portion of the strength members, including the strength members 164, and the second portion of the strength members, including the strength member 166(1), 166(2) (step 170 of FIG. 7). In this manner, the at least one strength member 70 may be more effectively attached in the demarcation 68. With continued reference to FIG. 16, the process 144 may also include receiving the bonding agent 134 into the at least one cavity 138(1), 138(2) disposed within the cable jacket 62 at the cable jacket interface 60 to form the demarcation 68 inside the cable jacket 62 at the cable jacket interface 60 (step 172 of FIG. 7).

Figure 17:
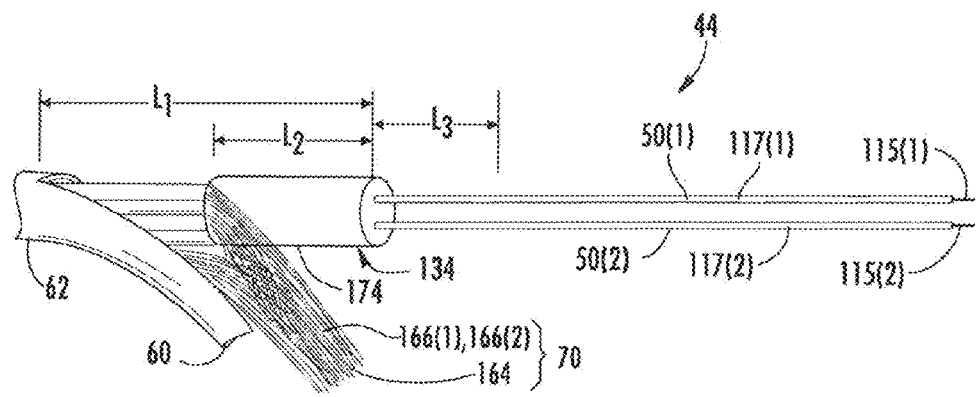
FIG. 17 is a side view of the fiber optic cable of FIG. 16 with the glue stick tube positioned in the demarcation, illustrating an initial formation of contents of the demarcation.
Figure 18:
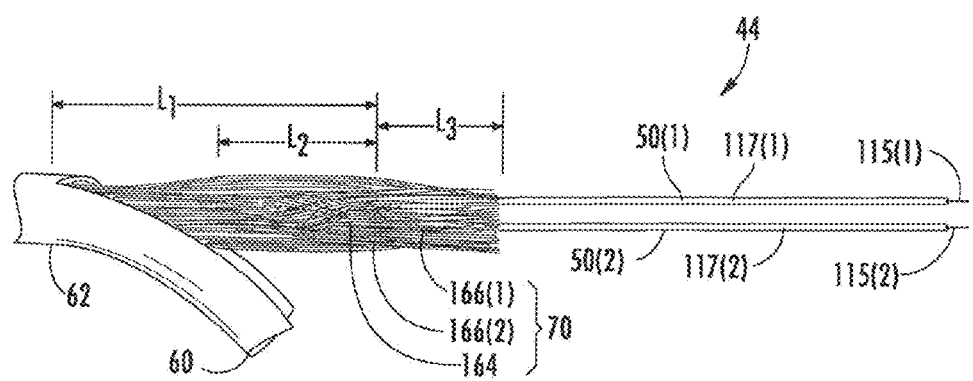
FIG. 18 is a side view of the fiber optic cable of FIG. 17 with the strength members of the fiber optic jacket and the strength members of the fiber subunits being uniformly arranged around the glue stick tube and the optical fibers of the fiber optic cable.
Figure 19:
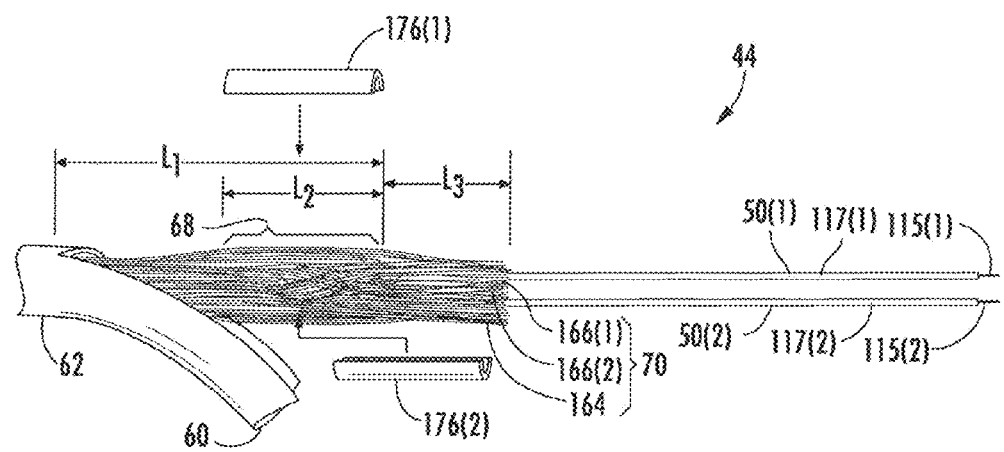
FIG. 19 is a side view of the fiber optic cable of FIG. 18 with glue stick halves being placed on opposite sides of the strength members of the cable jacket and the strength members of the fiber subunits, to illustrate placing a bonding agent, including the glue stick tube and the glue stick halves, within the demarcation.
Figure 20:
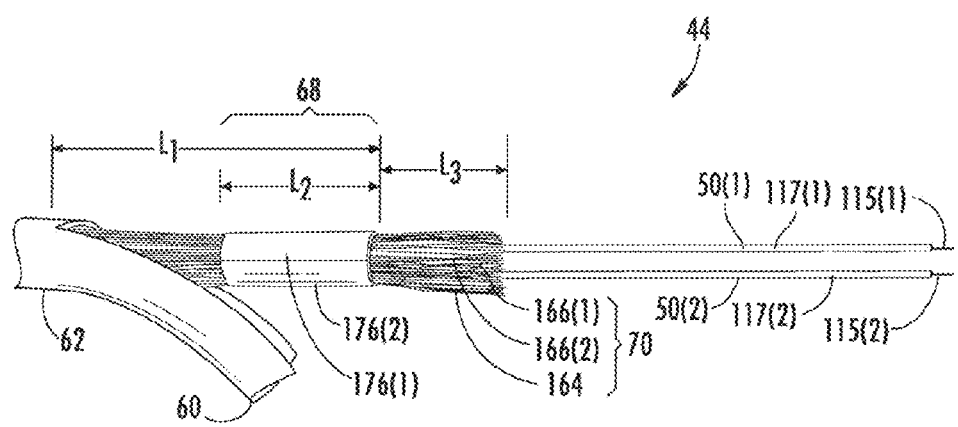
FIG. 20 is a side view of the fiber optic cable of FIG. 19 with the glue stick halves disposed around the strength members and abutting the strength members, illustrating forming the demarcation prior to re-closing of the cable jacket.

FIG. 17 depicts the bonding agent 134 at the cable jacket interface 60. The bonding agent 134 may comprise a glue stick 174 as depicted in FIGS. 16-17, which may be configured to slide over the at least one optical fiber 50(1), 50(2). FIG. 18 depicts the at least one strength member 70 being uniformly distributed over the glue stick 174. FIGS. 19-20 depict the bonding agent 134 also including glue stick portions 176(1), 176(2) being placed over the at least one strength member 70 to also fill the at least one cavity 138(1), 138(2). The at least one cavity 138(1), 138(2) was previously occupied by the portions 159(1), 15(2) (FIG. 13) of the filler units 136(1), 136(2). In this manner, the cable jacket 62 may form the secondary attachment 132 with the at least one strength member 70.

Figure 21:
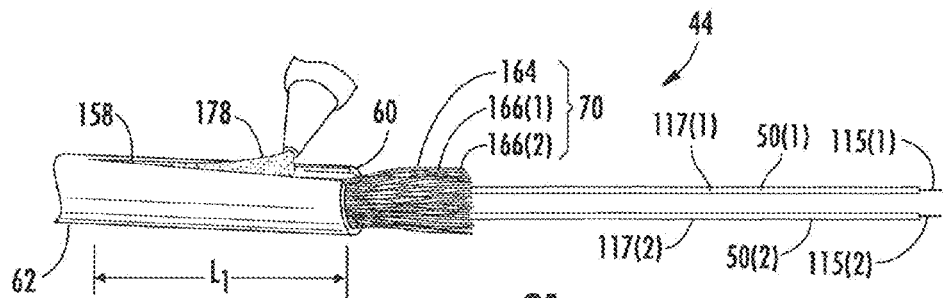
FIG. 21 is a side view of the fiber optic cable of FIG. 20 with the cable jacket being optionally attached with hot glue around the optical fibers and strength members.
Figure 22:
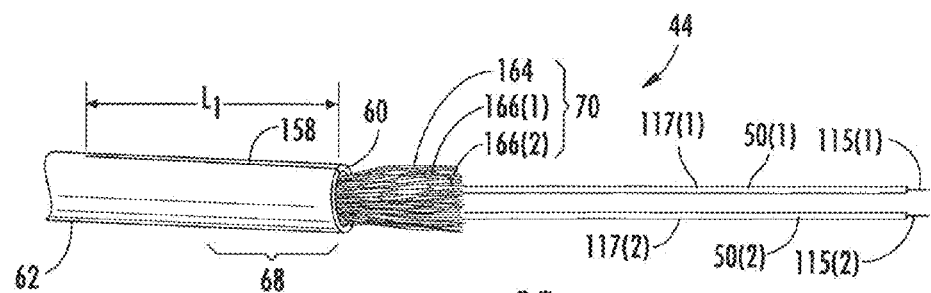
FIG. 22 is a side view of the fiber optic cable of FIG. 21 with the cable jacket re-closed to surround the demarcation.

FIG. 22 depicts the cable jacket 62 re-closed at the demarcation 68 (step 180 of FIG. 7). The cable jacket 62 may remain positioned in the re-closed position without assistance, or may optionally be temporarily held in the re-closed position by an application of adhesive, cohesive, or mechanical clamp. For example, hot glue 178 may be optionally disposed in the longitudinal cut 158 to hold the cable jacket closed as depicted in FIG. 21.

Figure 23:
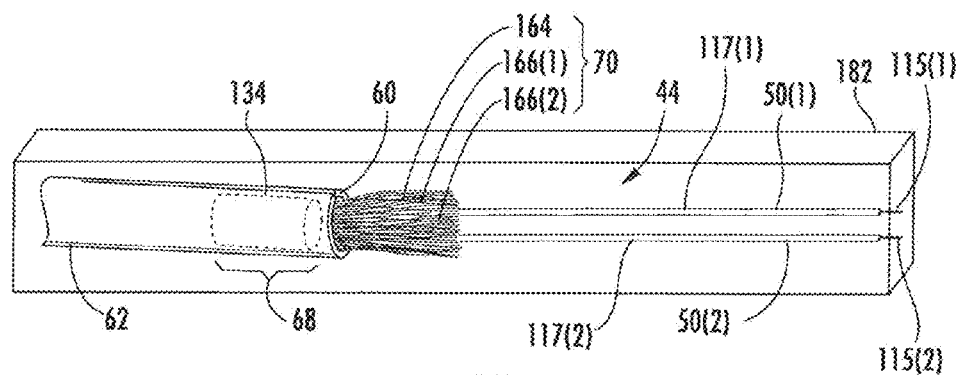
FIG. 23 is a side view of the fiber optic cable of FIG. 22 within a heating unit, illustrating the glue stick being bonded to the strength members, cable jacket, and optical fibers.

FIG. 23 depicts the fiber optic cable 44 in a heating unit 182 to heat the bonding agent 134 as part of a thermal cycle (step 184 of FIG. 7). The heating unit 182 may heat the fiber optic cable 44 at or above a melting temperature of the bonding agent 134. The melting temperature may be, for example, at least 150 degrees Celsius. The at least one strength member 70 and the at least one optical fiber 50(1), 50(2) may contact the bonding agent 134 within the demarcation 68 to form a bond between the at least one optical fiber 50(1), 50(2) and the at least one strength member 70 together to inhibit longitudinal movement of the at least one optical fiber 50(1), 50(2) relative to the at least one strength member 70.

As shown in FIG. 4, the fiber optic cable 44 may be allowed to cool after removal of the fiber optic cable 44 from the heating unit 182 (step 186 of FIG. 7). However, it is noted that the cooling may occur within the heating unit 182. After cooling, the at least one optical fiber 50(1), 50(2) may be attached to the fiber optic connector 40. Further, the at least one strength member 70 may be secured to the fiber optic connector 40.

Figure 24A:
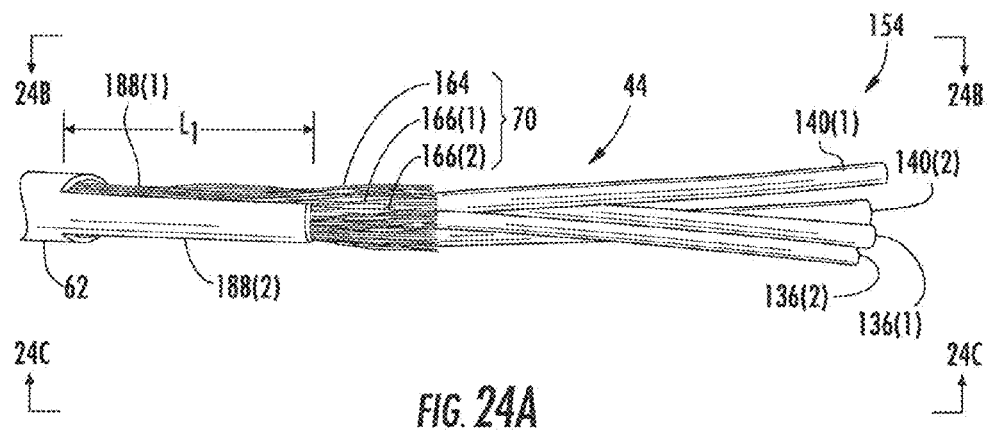
FIGS. 24A-24C are side, top, and bottom views, respectively, of a fiber optic cable which is another example of the fiber optic cable of FIG. 4, with slots cut into the cable jacket, illustrating an alternative manner of creating the demarcation.
Figure 24B:
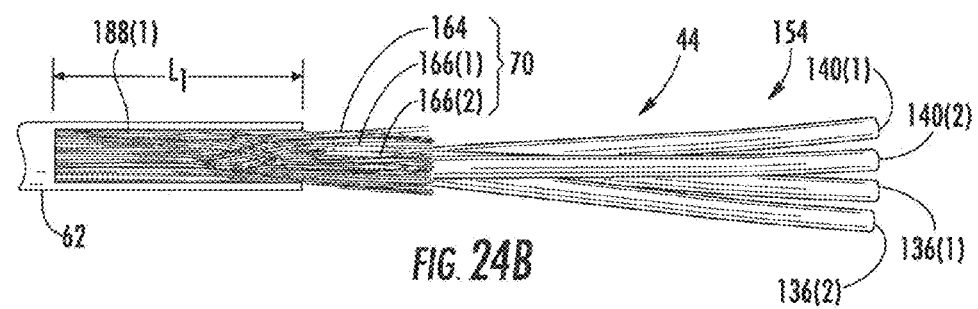
Figure 24C:
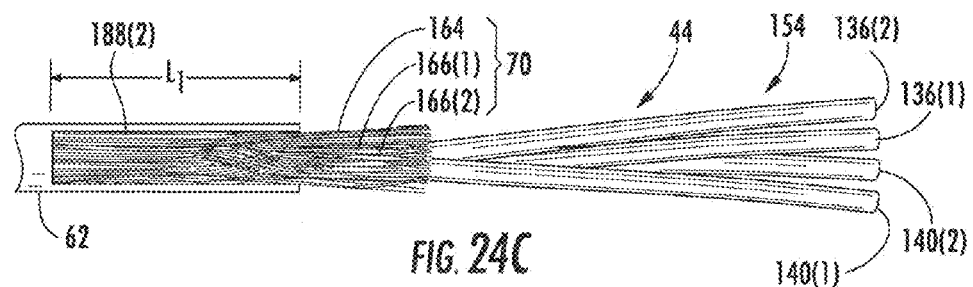

FIGS. 24A through 26 depict variations of the process 144. For example, the at least one longitudinal cut 158 of step 156 in FIG. 7, may be replaced with at least one slot 188(1), 188(2) created by removing portions of the cable jacket 62 (step 156' of FIG. 7). FIG. 24A depicts a side view of the fiber optic cable 44. FIG. 24B depicts a top view of the fiber optic cable 44 showing the slot 188(1), and FIG. 24C depicts a bottom view of the fiber optic cable 44 showing the slot 188(2). The slots 188(1), 188(2) may be cut out of the cable jacket 62 with, for example, a pair of shears (not shown) so as not to damage the at least one strength member 70. In this manner, the at least one slot 188(1), 188(2) may allow the at least one strength members 70 to be more easily pulled away to expose the at least one fiber subunit 140(1), 140(2).

Figure 25:
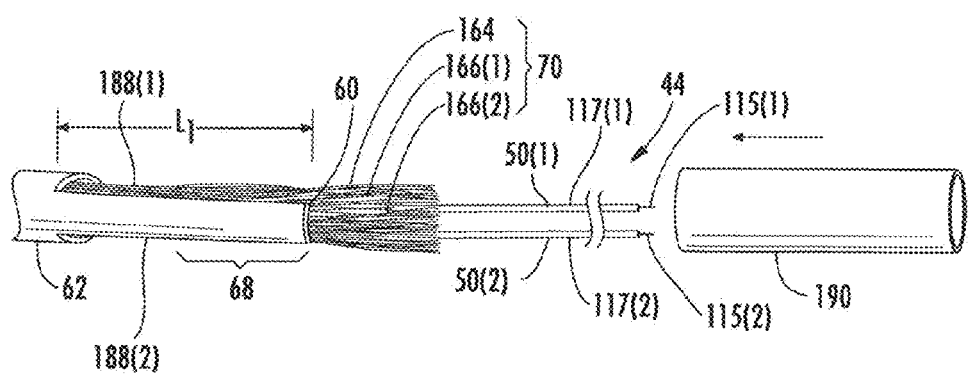
FIG. 25 is a side view of the fiber optic cable of FIGS. 24A-24C with a heat shrink tube of the cable jacket being disposed around the demarcation, illustrating the heat shrink being moved into position before being shrunk by a heat source.
Figure 26:
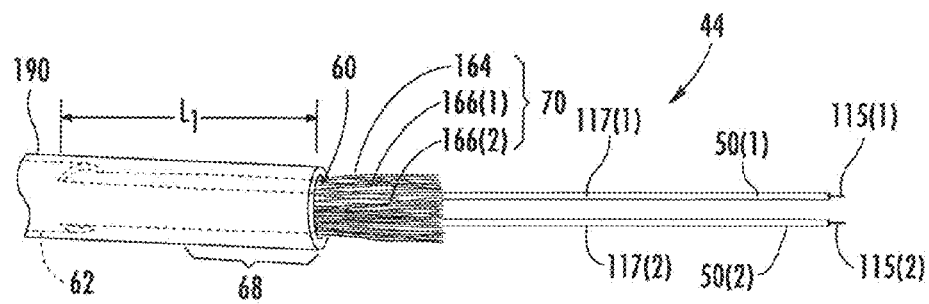
FIG. 26 is a side view of the fiber optic cable of FIG. 25 with the heat shrink tube shrunk to cover the demarcation and the slots.

Moreover, FIGS. 25 and 26 depict that the cable jacket 62 may include a heat shrink tubing 190 which may be slid over the optical fibers 50(1), 50(2) to surround the slots 188(1), 188(2) and demarcation 68 (step 180' of FIG. 7). The heat shrink tubing 190 may be shrunk to cover the slots 188(1), 188(2) as shown in FIG. 26 with a hot air gun or other heat source. In this manner, the cable jacket 62 may provide support for the demarcation 68 by closing the slots 188(1), 188(2). It is noted that after step 180', the steps 184 and 186 may occur substantially the same as depicted in FIG. 7.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A method of preparing a demarcation for a fiber optic cable, comprising:
   providing a fiber optic cable comprising a cable jacket, at least one optical fiber disposed in the cable jacket, at least one strength member disposed in the cable jacket, and at least one cavity disposed inside the cable jacket;
   removing the cable jacket from an end portion of the fiber optic cable to expose the at least one optical fiber from the cable jacket at a cable jacket interface; and
   receiving a bonding agent into the at least one cavity disposed within the cable jacket at the cable jacket interface to form a demarcation inside the cable jacket at the cable jacket interface and bonding the at least one optical fiber and the at least one strength member together to inhibit longitudinal movement of the at least one optical fiber relative to the at least one strength member.

2. The method of claim 1, wherein the bonding the at least one optical fiber comprises heating the bonding agent above a melting temperature of the bonding agent and then cooling the bonding agent.

3. The method of claim 1, wherein the bonding agent is at least one glue stick.

4. The method of claim 1, wherein each of the at least one optical fiber includes a buffer layer.

5. The method of claim 1, wherein the at least one strength member and the at least one optical fiber contact the bonding agent within the demarcation.

6. The method of claim 1, further comprising removing a portion of each at least one filler unit from the fiber optic cable to form the at least one cavity, wherein the providing the fiber optic cable further includes the at least one filler unit.

7. The method of claim 6, wherein the removing the portion of each of the at least one filler unit comprises removing less than fifteen millimeters in a longitudinal direction of each of the at least one filler unit.

8. The method of claim 1, further comprising attaching a fiber optic connector to the at least one optical fiber.

9. The method of claim 8, further comprising securing at least one of the at least one strength member to the fiber optic connector.

10. The method of claim 1, wherein the providing the fiber optic cable further includes each of the at least one optical fiber as a part of one of at least one fiber subunit,
    the at least one strength member includes a plurality of strength members, and
    a first portion of the plurality of strength members is part of the at least one fiber subunit and a second portion of the plurality of strength members is disposed outside of the at least one fiber subunit.

11. The method of claim 10, further comprising twisting together the plurality of strength members.

12. The method of claim 10, further comprising freeing the at least one optical fiber and the first portion of the plurality of strength members from the at least one fiber subunit in the demarcation prior to the bonding.

* * * * *